United States Patent [19]

Jones

[11] Patent Number: 4,715,008
[45] Date of Patent: Dec. 22, 1987

[54] HAND-HELD DIGITAL THICKNESS GAGE

[75] Inventor: Robert L. Jones, La Habra, Calif.

[73] Assignee: NDT Instruments, Inc., Huntington Beach, Calif.

[21] Appl. No.: 450,845

[22] Filed: Dec. 17, 1982

[51] Int. Cl.⁴ .............................................. G01B 17/02
[52] U.S. Cl. ..................... 364/563; 73/1 J; 73/597; 73/629
[58] Field of Search ............... 73/614, 615, 620–633, 73/1 DV, 597, 598, 1 J; 364/562, 563, 481; 367/118, 127, 129, 189; 340/172.5; 455/155, 158, 180, 182

[56] References Cited

U.S. PATENT DOCUMENTS

| | | | |
|---|---|---|---|
| 3,608,362 | 9/1971 | Chakar | 73/629 |
| 3,742,435 | 6/1973 | Pann | 367/127 |
| 3,792,613 | 2/1974 | Comture | 73/629 |
| 3,858,438 | 1/1975 | Neumann | 73/615 |
| 3,929,006 | 12/1975 | Boggs | 73/615 |
| 3,948,086 | 5/1976 | Kitada | 73/615 |
| 3,985,022 | 10/1976 | Dileo | 73/629 |
| 3,994,154 | 11/1976 | Niklas et al. | 73/629 X |
| 4,070,917 | 1/1978 | Niklas | 73/598 |
| 4,090,247 | 5/1978 | Martin | 340/172.5 |
| 4,114,455 | 9/1978 | Walher | 73/597 |
| 4,306,294 | 12/1981 | Hashimoto et al. | 455/158 |
| 4,307,611 | 12/1981 | Opera | 73/597 |
| 4,324,141 | 4/1982 | Stearn | 73/627 |
| 4,353,257 | 10/1982 | Vrba et al. | 73/615 X |
| 4,437,332 | 3/1984 | Pittero | 73/627 |

Primary Examiner—Errol A. Krass
Assistant Examiner—Edward R. Cosimano
Attorney, Agent, or Firm—Leonard Tachner

[57] ABSTRACT

A microprocessor-controlled, hand-held, digital ultrasonic thickness gage having automatic zero calibration, scroll velocity adjustment and an electronic locking feature to prevent inadvertent calibration or velocity data variations. This invention is used with a dual-element transducer and, in that regard, employs a microprocessor program which automatically corrects for the well-known, inherent thickness gaging inaccuracies (nonlinearities) always caused by the use of the otherwise advantageous (high sensitivity) dual element transducer.

21 Claims, 8 Drawing Figures

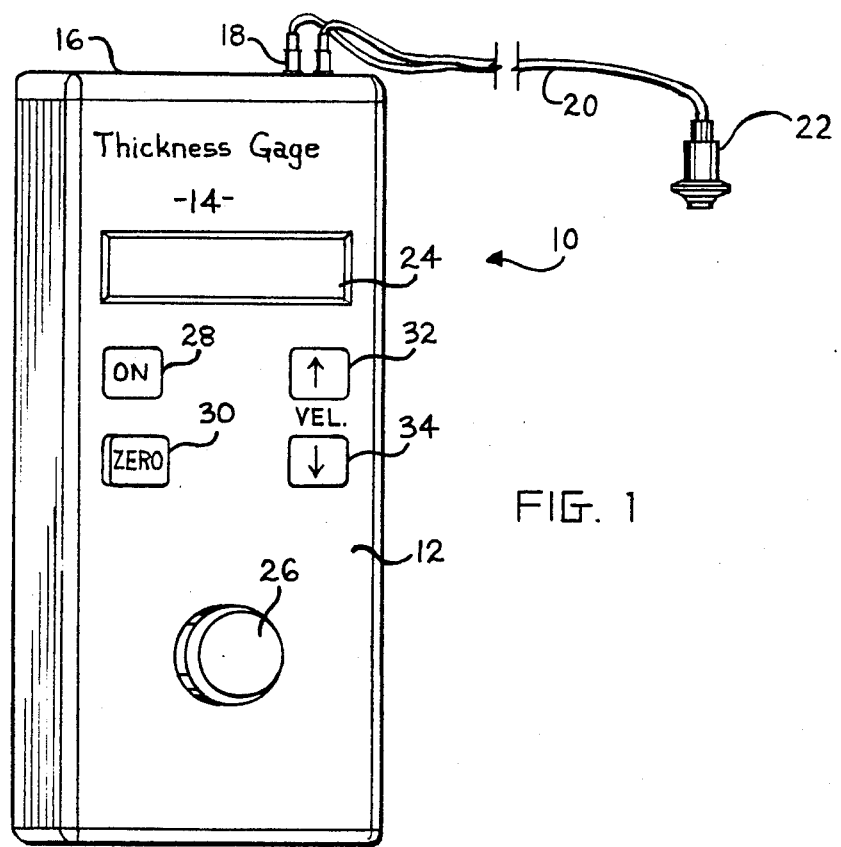
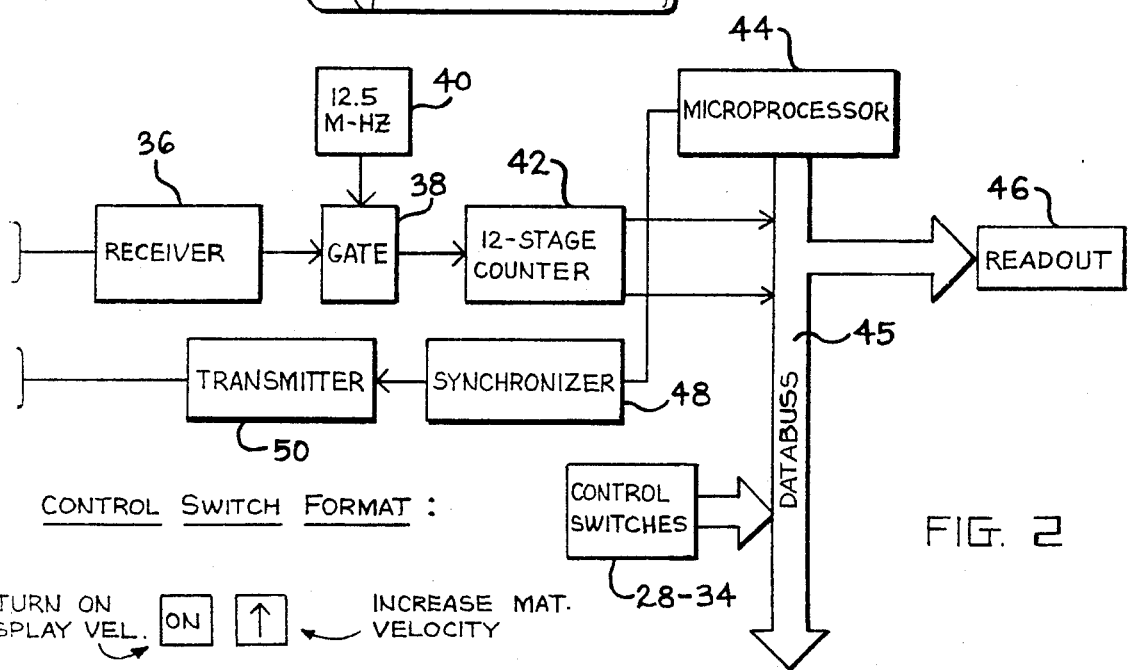
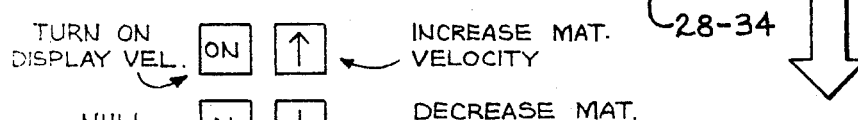

HAND-HELD DIGITAL THICKNESS GAGE

BACKGROUND OF THE INVENTION

1. Field of the Invention

The present invention relates generally to an electronic apparatus for measuring the thickness of a wide variety of materials and products, and more particularly, to a hand-held, high sensitivity digital ultrasonic thickness gage primarily for measuring the wall thickness of objects such as heat exchanger tubing, pressure vessels, storage tanks, ship hulls, piping and valves, plates, slabs, etc. While mostly used for gaging metals, the gage is also applicable to glass, plastic, fiberglass and other materials which satisfactorily conduct ultrasonic waves.

2. Prior Art

Portable hand-held digital thickness gages are already in the prior art. By way of example, a Model DM2 Meter is sold by Krautkramer-Branson of Stratford, Conn. However, each such prior art portable hand-held thickness gage suffers from one or more disadvantages which the present invention is designed to overcome. More specifically, the principal advantage of all such gages is the convenience of use which a portable hand-held battery operated digital thickness gage can provide those in the field whose job it is to inspect heat exchanger tubing, pressure vessels, storage tanks, ship hulls, piping and valves as well as similar objects to determine whether or not the thickness of such devices is either satisfactory or which will require rejection, repair or replacement. Typically, in order to provide a thorough and complete inspection of such devices it is often necessary to make a large number of measurements in the period of one 8-hour working day. Accordingly, a device that may be hand-held and battery operated with only a minimum of convenient calibration adjustments, minimizes the difficulty, time consumption and therefore the labor costs related to carrying out such a large number of measurements.

Unfortunately, the prior art hand-held digital ultrasonic thickness gages that are currently available significantly diminish the outerwise advantageous nature of such measurement devices by requiring the user to make certain inconvenient pretest adjustments such as zero calibration and material velocity adjustments which require the use of either a screw driver or thumbwheel switches which are relatively inconvenient to operate. In addition to the general inconvenience disadvantage of pretest adjustments that are necessary in such prior art devices, the very control mechanism for making these adjustments is also highly disadvantageous. More specifically, these adjustments render it more likely that the operator will inadvertently touch a thumbwheel switch or a screwdriver adjustment without realizing it, thereby uncalibrating the instrument and rendering the measurement erroneous. Furthermore, these controls provide paths into the interior of the instrument for moisture and other elements which can be particularly disadvantageous during outdoor work or work in high humidity indoor environments. As a result, the likelihood of failure of the instrument and the expense of inspection "downtime", need for costly repairs or replacement of the instrument, or its components, becomes more probable, thereby decreasing the otherwise advantageous nature of the portable hand-held digital thickness gage.

SUMMARY OF THE INVENTION

The present invention overcomes the aforementioned disadvantages of the prior art by providing a novel microprocessor-controlled hand-held portable digital thickness gage which includes an automatic zero calibration control as well as a far more convenient means for adjusting the measurement velocity in accordance with the material being tested and without requiring the use of either screwdriver controls or thumbwheel switches of the prior art. Furthermore, the present invention provides a unique limited access feature which permits the user to electronically lock the available controls in a condition in which inadvertent actuation of the automatic zeroing or velocity calibration controls will not affect those parameters of measurement unless the user intends to, thereby preventing the inconvenience and inaccuracies of the prior art devices noted above.

Also, this invention provides a microprocessor-based circuit which automatically compensates for certain thickness gaging non-linearity effects which otherwise occur at the thin end of the measuring range with such gages which use a dual-element transducer.

In addition to the above-noted advantages of the present invention, the unique microprocessor based circuit of the invention provides a novel data bus access connection permitting the user to connect the device of the present invention to an additional digital apparatus for transferring the thickness readings gathered by the device into a central memory whereby thickness measurements and their respective location (addresses) taken over an extended period of time on a plurality of job sites, can be stored in one location to provide an accurate record of the user's activities.

OBJECTS OF THE INVENTION

It is therefore an object of the present invention to provide a novel hand-held portable digital ultrasonic thickness gage which substantially reduces or entirely overcomes the aforementioned disadvantages of the prior art.

It is an additional object of the present invention to provide a portable hand-held digital ultrasonic thickness gage which is especially adapted for making large numbers of high-speed measurements in the field without requiring the user to make any screwdriver or thumbwheel switch adjustments for measurement calibration.

It is still an additional object of the present invention to provide an improved hand-held portable digital ultrasonic thickness gage which utilizes a microprocessor-based circuit that enables push-button scrolling to set the proper material velocity and automatic zero calibration for conducting the measurement.

It is still a further object of the present invention to provide an improved hand-held portable digital ultrasonic thickness gage in which the zero calibration and material velocity controls are essentially immune from accidental and inadvertent misadjustment.

It is still a further object of the present invention to provide an improved hand-held portable digital ultrasonic thickness gage in a sealed unit which still provides access to a measurement data bus for transfer of measurement and other information to a recording device.

BRIEF DESCRIPTION OF THE DRAWINGS

The aforementioned advantages and objects of the present invention as well as additional objects and advantages thereof will be more fully understood hereinafter as a result of a detailed description of a preferred embodiment of the invention when taken in conjunction with the drawings in which:

FIG. 1 is a three dimensional view of the improved thickness gage of the present invention;

FIG. 2 is a simplified block diagram of the present invention;

FIG. 3 is a illustration of the control switch format of the present invention;

DETAILED DESCRIPTION OF A PREFERRED EMBODIMENT

Figure 4:
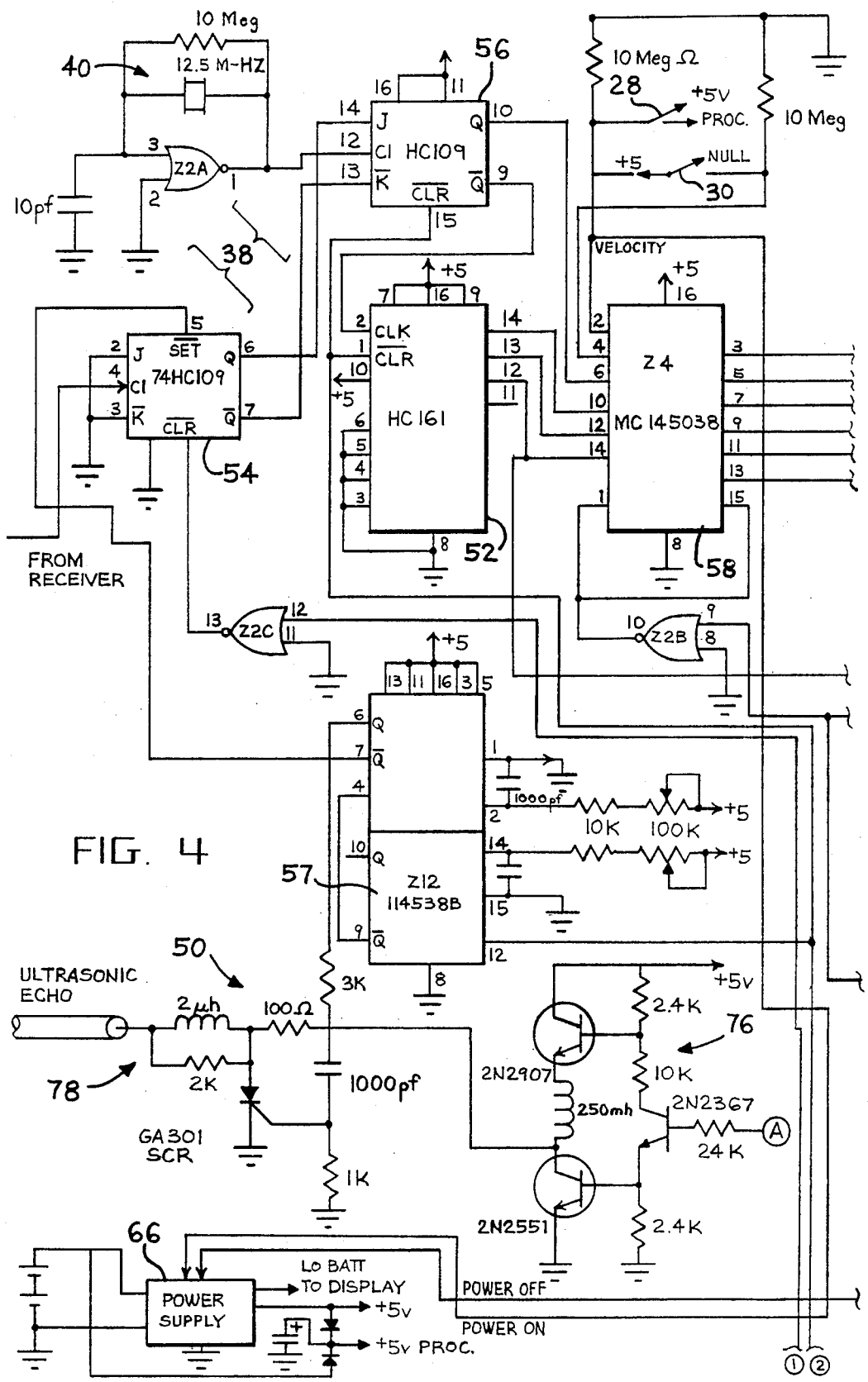
FIGS. 4 to 6 together comprises a detail schematic diagram of the digital portion of the invention.

Referring now to FIG. 1 there is shown a hand-held portable digital ultrasonic thickness gage comprising the invention 10 and having a rectangular case 12 including a front face 14 and a top face 16. Located on top face 16 is a connector 18 to which is shown a transducer cable 20 connected at its other end to a dual-element transducer 22. Front face 14 comprises a display 24, a built-in reference specimen 26, an ON control 28, an automatic zero control 30, and a pair of velocity scroll controls 32 and 34.

In a preferred embodiment, case 12 is approximately 6 inches long, 2.7 inches wide and 1.2 inches deep. Accordingly, it will be seen that the invention is readily held by the user in one hand thereby freeing the user's other hand to apply the transducer 22 to the specimen under test. Typically, the thumb of the user's hand which holds the invention 10 is all that is required to operate the invention. More specifically, in typical operation, the user would, by using his thumb, depress the ON control 28 thereby activating the instrument and placing it in a measurement mode. The user would then apply the transducer 22 to the built-in reference specimen 26 and press the automatic zero control 30 which enables the digital portion of the present invention to automatically zero calibrate the gage thereby compensating the measurement for cable length time delays and other delays not associated with the actual thickness of the test specimen. The user then depresses the ON control 28 once again which automatically enables the digital portion of the invention to display a velocity figure. Typically, the figure initially displayed will be previously set for a particular material such as aluminum and if the user is operating the invention on an aluminum specimen, the velocity that has been preset will be the velocity figure that he will continue to use during his measurement. However, if the material under test is one other than for which the instrument has been preset, the user either increases or decreases the velocity figure by depressing velocity scroll control 32 or 34, respectively. For purpose of further clarity, the format of control switches 28 through 34 and the manner in which they control the operation of the invention is illustrated in diagrammatic form in FIG. 3.

Another unique feature of the present invention pertains to the manner in which the controls 28 through 34 may be used to preclude any inadvertent readjustment of the zero calibration and velocity settings during use of the apparatus by accidental depression of any of those keys. More specifically, the present invention is designed to lock in the zero calibration and velocity data intentionally entered by the user. This is accomplished when the ON control 28 is depressed simultaneously with the ZERO control 30 and held for several seconds subsequent to the entry of the velocity data for the material being tested at zero calibration of the instrument. Thereafter, in order to subsequently change zero calibration and/or velocity data for a further test, the user may enable those controls by again depressing the ON control 28 and the ZERO control simultaneously as previously indicated. In this manner it is possible to prevent the aforementioned inadvertent variation of these settings that have, as previously indicated, become a significant disadvantage of prior art devices.

Thus, it can be seen from FIG. 1 and FIG. 3 that not only is the invention extremely convenient to use for a large number of successive measurements, but in addition, the invention is designed to prevent inadvertent variation of calibration and velocity data which would otherwise decrease the accuracy of the measurement. Furthermore, it is to be noted that the case 12 is sealed to prevent the inadvertent entry of moisture and other such inimical elements in the field which might otherwise tend to reduce the life of the electronics and increase the cost and frequency of repair and maintenance. This sealing of case 12 is made possible by the use of film depression switches for controls 28 through 34 while precluding the use of screwdriver adjustments and thumbwheel switches as found in the prior art.

Reference shall now be made to FIG. 2 for a brief discussion of the overall electronic architecture of the present invention. More specifically, as seen in FIG. 2 the invention comprises a receiver 36, a gate circuit 38, a high speed oscillator 40, a multi-stage counter 42, a microprocessor 44, a read-out driver 46, a synchronizer 48 and a transmitter 50.

Receiver 36 and transmitter 50 operate in combination with transducer 22 to which they are connected respectively by cable 20 in a well-known manner, to generate an ultrasonic pulse that is transmitted into a test specimen and reflected by the opposite surface of the specimen to produce a received pulse in receiver 36. Gate 38 is, in effect, open upon transmission of the pulse and closed upon reception of the pulse. During the period that gate 38 remains open, $12\frac{1}{2}$ MHz. high speed pulser 40 is permitted by gate 38 to pass pulses into multi-stage counter 42 until gate 38 is closed upon reception of the reflected pulse by receiver 36. The count developed in multi-stage counter 42 is therefore representative of the time period between the transmitted pulse and the received pulse. As a result, by utilizing a well-known formula including an accurate figure for the velocity of the ultrasonic pulse signal through the particular material being tested, the thickness of the material under test may be calculated. This calculation is performed by microprocessor 44 which receives the count information from multi-stage counter 42 by means of data bus 45.

After microprocessor 44 performs the aforementioned calculation of specimen thickness, the thickness figure is output to read-out driver 46 for transfer to display 24 (see FIG. 1) to report the test measurement to the user. As previously indicated, display 24 is also used to provide velocity data to the user for adjustment of the velocity figure for different materials. This information is also provided by microprocessor 44 via readout driver 46 as will be hereinafter more fully discussed in conjunction with FIGS. 4 to 6. As also shown in FIG. 2, control switches 28 through 34 are connected to data bus 45 for input to microprocessor 44 as will also be more fully disclosed hereinafter. Data bus 45 also provides a data output means to allow external data gathering in an ancillary data memory device which may be connected to the present invention if the user desires to transfer measurement data to a more elaborate memory device.

Figure 5:
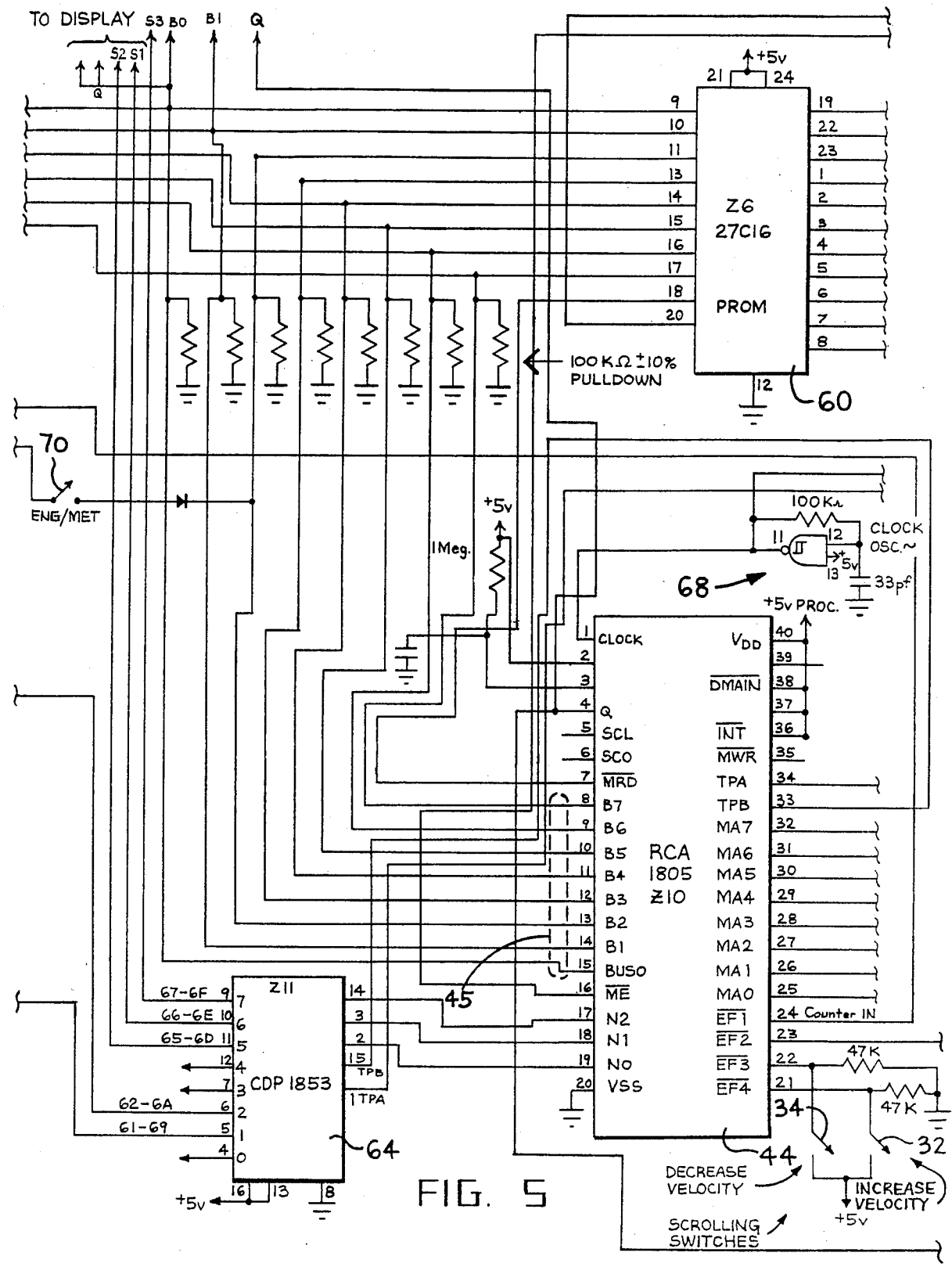
Figure 6:
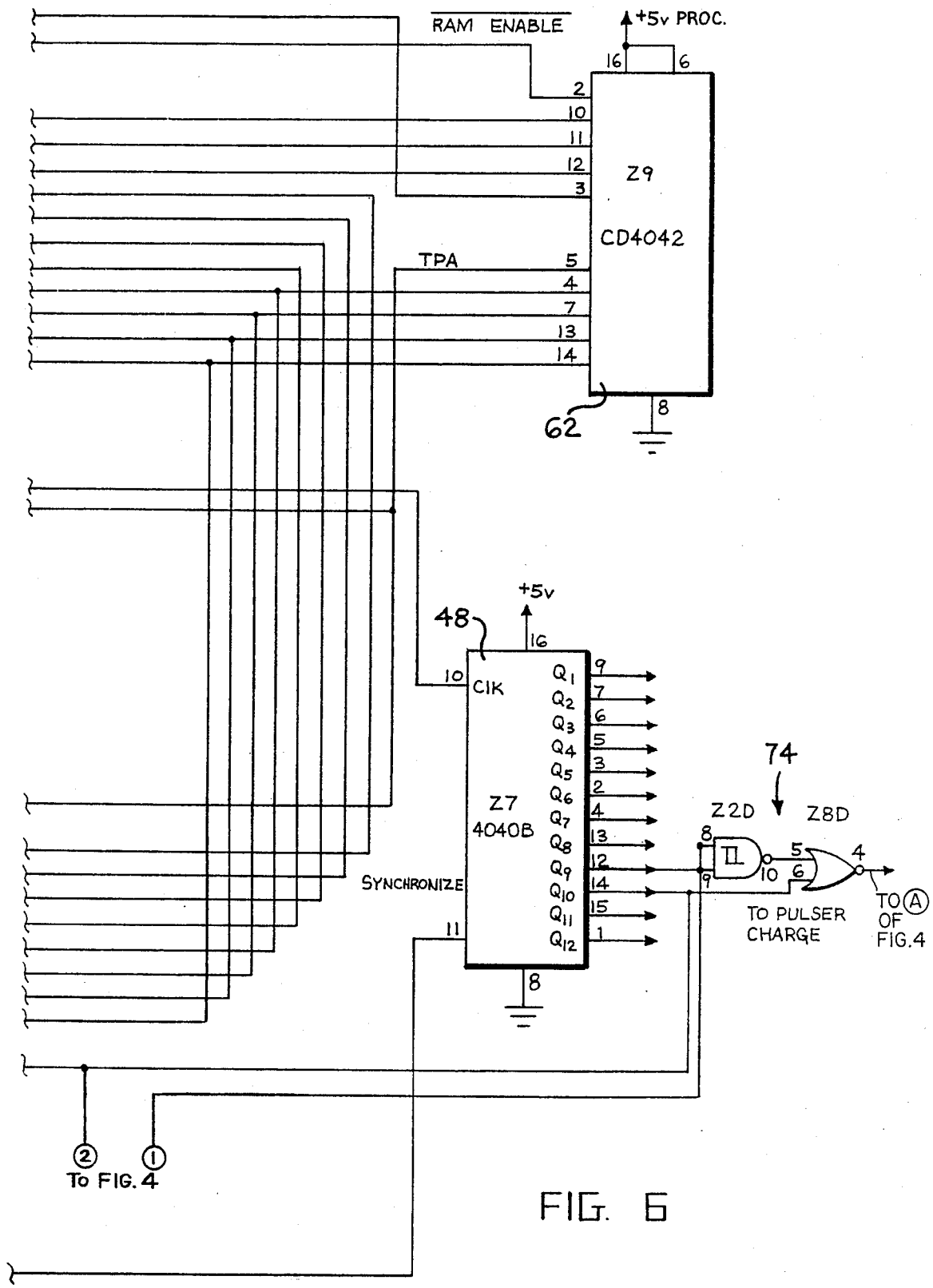

Reference will now be made to FIGS. 4, 5 and 6 for a more detailed description of the digital portion of the present invention. Referring to FIGS. 4, 5 and 6 concurrently, it will be seen that the major components of the digital portion of the invention comprise the gate circuit 38 which includes a pair of flip-flops 54 and 56, a high speed oscillator 40, a microprocessor 44, a synchronizer circuit 48, a transmitter circuit 50, a 4-bit counter 52, a hex interface circuit 58, a PROM 60, a latch 62, a decoder 64, a power supply 66, and a clock pulse generator 68. The heart of the digital portion of the present invention is an RCA Model CDP1805C type microprocessor 44. This microprocessor is a CMOS 8-bit microprocessor with on-board RAM and includes a counter. This microprocessor includes a built-in 64-bit RAM memory array and an 8-bit presetable down counter. The microprocessor 44 is described in a publication of the RCA Solid State Division entitled "Memory/Microprocessor Products, File No. 1439", published in May, 1982. The program for carrying out the microprocessor control operations of the circuit of FIGS. 4, 5 and 6 is contained within a programmable read only memory device 60 which as shown in FIG. 5 comprises a Model MMC27C16 PROM. PROM 60 operates in conjunction with a latch 62 which comprises a model CD 4042B quad clocked latch. Latch 62 facilitates data transfer between PROM 60 and the random access memory contained within microprocessor 44 including means for enabling the random access memory internal to microprocessor 44.

The synchronizer circuit 48 comprises a Model CD4040B 12-stage counter from which the 500 microsecond and 1 millisecond pulse counts are extracted to synchronize the operation of the ultrasonic transmitter with the gate and count circuits of the digital portion of the invention. Decoder circuit 64 comprises a Model CDP1853 1 of 8 decoder which is used to expand the three IO commands, N0, N1 and N2 of microprocessor 44 into eight possible commands for use in the digital portion of the invention.

Other major components of the digital portion of the present invention include a Model 74HC161 4-bit counter circuit 52, a Model MC14538B dual monostable multi-vibrator circuit 57, a Model 74HC109 dual JK flip-flop 54 and 56 and a Model MC14503B hex tri-state buffer circuit 58. Circuits 52, 54, 57 and 58 are used for timing, gating and counting operations for measuring the time differential between the transmitted and received ultrasonic pulse transmitted into the specimen under test.

In operation, initially a pulse is transmitted into the specimen by transmitter 50 as a result of an output pulse from synchronizer 48. Flip-flop circuit 54 will be preset and cleared setting its Q output line high and its $\overline{Q}$ output line low thereby enabling flip-flop 56 in a toggle output condition responsive to the output signal of high speed oscillator 40, the frequency of which is set by crystal at 12.5 MHz. Flip-flop 56 is, accordingly, the first stage of a multi-stage counter with its Q and $\overline{Q}$ output lines generating toggled logic states in response to the high frequency oscillator 40. This toggling action continues until the receiver (not shown) generates a signal in response to the received echo pulse which signal is applied to the clock terminal of flip-flop 54. When this event occurs, the Q and $\overline{Q}$ output lines of flip-flop 54 are placed in a low and high logic condition, respectively, which immediately terminates the toggle action of flip-flop 56. Consequently, at this time the counting process terminates.

During the counting process flip-flop 56 comprises the first stage of a multi-stage counter. More specifically, as seen in FIG. 4, the Q output line of flip-flop 56 is connected to an input terminal of the hex tri-state buffer circuit 58 which transmits that signal to the microprocessor data bus 45. Similarly, the $\overline{Q}$ output line of flip-flop 56 is connected to the clock input terminal of the 4-bit counter circuit 52 which has its clear terminal connected to an output of synchronizer circuit 48 so that it is also enabled for counting upon the transmission of an ultrasonic pulse into the test specimen.

Three of the output terminals of 4-bit counter 52 are connected to respective input lines to the interface tri-state buffer circuit 58 and are therefore in turn connected to data bus 45. These three output lines together with the Q output line of flip-flop 56, provide the four least significant bits of the counter which registers the number of 12½ MHz. pulses generated by high speed pulser 40 between the time the ultrasonic pulse is transmitted into the test specimen and the echo pulse therefrom is received.

Terminal No. 12 of 4-bit counter 52 provides the most significant bit of the least significant 4-bits provided by circuits 52 and 56. This terminal is also connected to the EF1 terminal of microprocessor 44 which, upon proper commands, as will be hereinafter more fully discussed, is connected internally within the microprocessor to an additional 8-bit counter thereby enabling the remaining 8-bits of count capacity residing in the microprocessor to also respond sequentially in a well-known manner to the counting process to thereby provide a total of 12 bits of counting capacity. It will be seen hereinafter that the calculation of the thickness of the specimen under test is based on the average of a large plurality of the aforementioned counts utilizing microprocessor 44 as the calculating mechanism.

Microprocessor 44 provides numerous additional functions in the present invention. More specifically, microprocessor 44, in addition to calculating the thickness of the test specimen based on the average of a large number of high frequency pulse rate counts, also provides a multiplier for the calculation to correct for material velocity. It also provides for zero correction calibration in response to zero calibration information. It stores velocity information that is used in the calculation of test specimen thickness depending upon the material under test and it performs necessary conversions between binary digital format and binary coded decimal format as well as between binary coded decimal format and seven-segment format for display purposes. The details of the operation of microprocessor 44 in conjunction with the program stored in PROM 60 in performing the aforementioned functions, will be discussed more fully hereinafter.

The timing of operations within the digital portion of the present invention is provided by clock circuit 68 and synchronizer 48. Clock circuit 68 comprises an RC clock circuit and a Schmitt trigger device, the output of which is connected to the clock terminal of microprocessor 44 and the clock terminal of synchronizer circuit 48. Synchronizer circuit 48 is a 12-stage counter of which 2 output terminals are utilized in the present invention. More specifically, the oscillation rate of clock circuit 68 is approximately 1 M-Hz. resulting in a pulse signal at output terminals Q9 and Q10 of synchronizer 48 having respective periods of 500 microseconds and 1 millisecond. These two output signals are applied to a Schmitt trigger and NOR gate respectively to produce a pulse charge output signal which is applied to the A input terminal of transmitter 50 approximately each 1 millisecond. The 250 microsecond output signal at Q9 of synchronizer 48 is also applied to the $\overline{CLR}$ terminal of flip-flop 54 of gate circuit 38 to reset the gate after 250 microseconds. Furthermore, the 1 millisecond period output pulse available at Q10 of synchronizer 48 is applied to the dual monostable multi-vibrator 57 as well as to the clear terminals of 4-bit counter circuit 52 and flip-flop circuit 56 as well as to the $\overline{EF2}$ terminal of microprocessor 44 for the purpose of resetting the 12 stages of the combined counter of the digital portion of the invention every millisecond.

It will be noted that there are five switches associated with the present invention, namely, ON switch 28, zero calibration null switch 30, velocity increase switch 32 and velocity decrease switch 34, each of which has been discussed previously in conjunction with FIG. 1, and an english/metric switch 70 which is designed to be factory set and is internal to case 12 of the invention. As seen in FIGS. 4 and 5, switches 28 and 30 are connected to terminals 2 and 4 respectively of the tri-state interface buffer circuit 58 which connects those two terminals to either ground or plus 5 volts depending upon the position of the switches. In addition, ON switch 28 is also connected to a latch circuit in the power supply, the output of which is connected to power supply 66 for generating the appropriate DC voltages for powering the invention. Velocity scrolling switches 32 and 34 are connected to the EF3 and EF4 terminals of microprocessor 44 respectively which are input/output flags into the microprocessor. The english/metric switch 70 is connected between one line of the microprocessor data bus 45 and an output of decoder circuit 64 for purposes of controlling the decimal point location of the display 24.

The components and operation of transmitter 50 are not considered to be a novel element of the present invention and will be apparent to those having skill in the art to which the present invention pertains. It will be understood that the pulse charge output signal developed by synchronizer circuit 48 in conjunction with digital logic 74, comprising a Schmitt trigger and NOR gate, controls the ON/OFF status of a transistor network 76 to permit the pre-energizing of a ringing circuit 78 comprising an RL network and an SCR. After ringing circuit 78 is charged, the ultrasonic pulse is transmitted into transducer 22 by means of triggering the SCR which is controlled by the Q output of dual monostable multi-vibrator 57 in response to the 1 millisecond output pulse at terminal Q10 of synchronizer 48.

Figure 7:
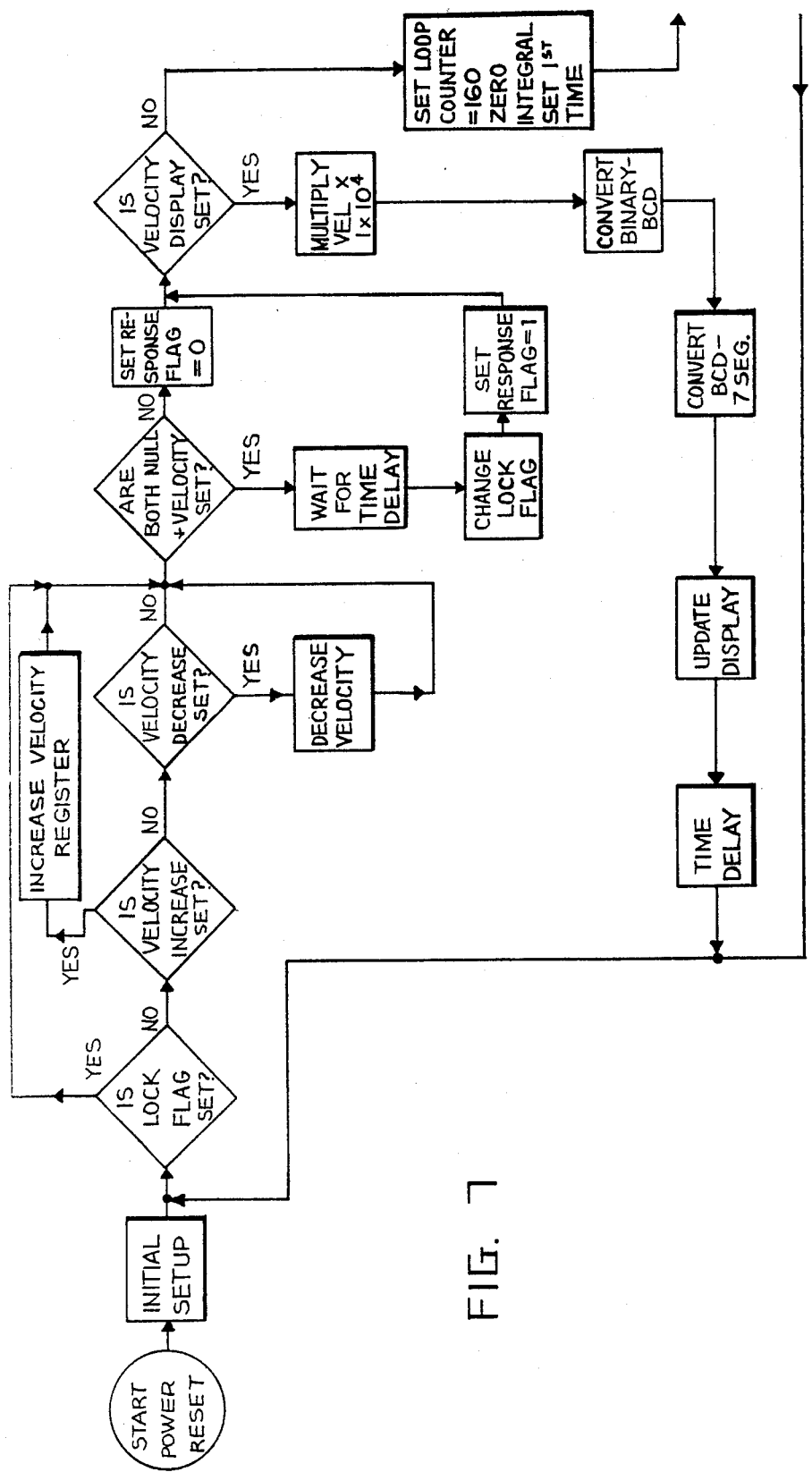
FIGS. 7 and 8 in combination provide a general flow diagram of the programmed operations carried out by the present invention.
Figure 8:
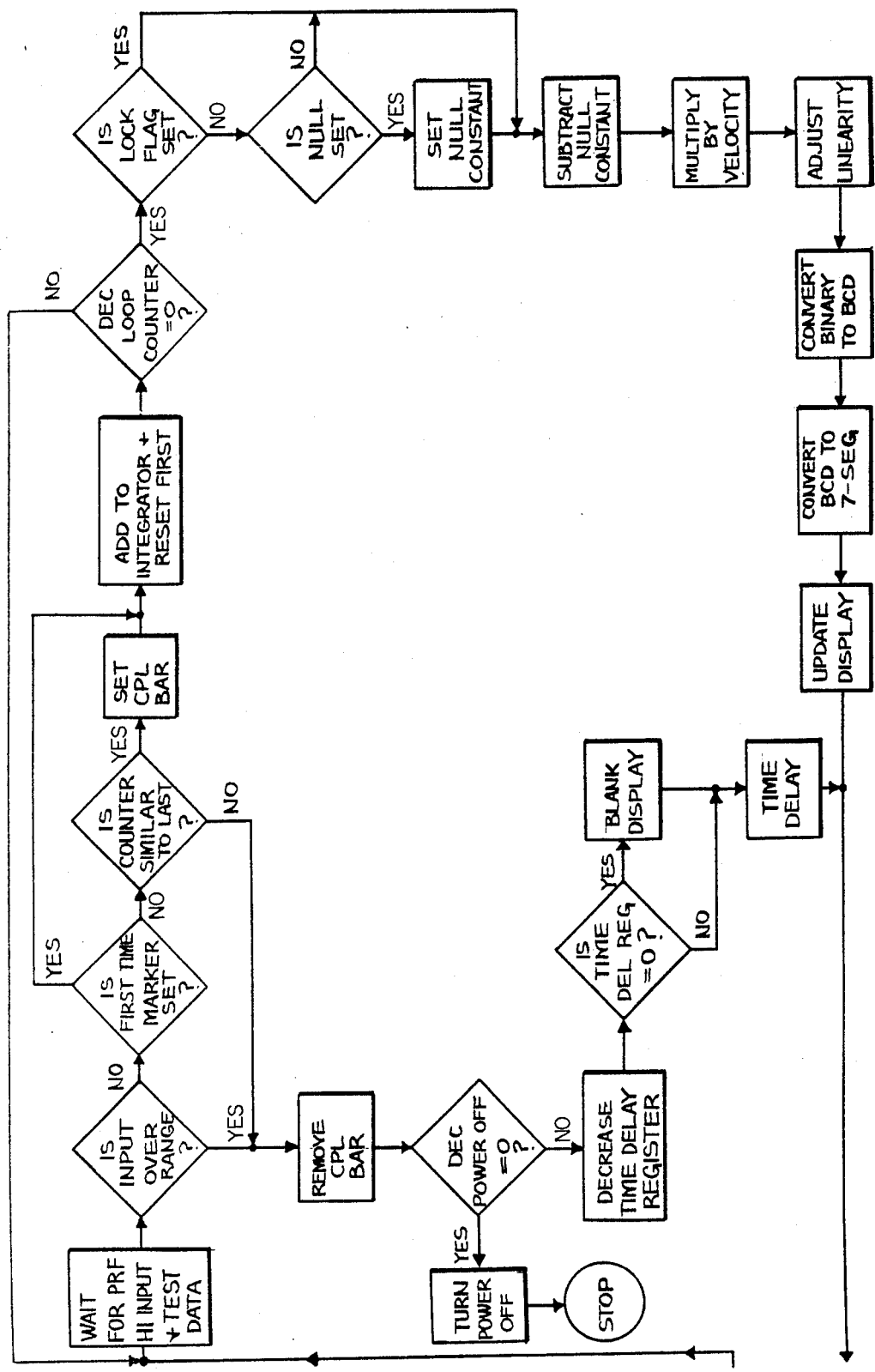

Reference will now made to FIGS. 7 and 8 for a general description of the manner in which the program of the present invention is carried out. The purpose of this description is to provide an overview of the various programmed operations without obfuscating the description with detailed step-by-step program statements. However, those having skill in the art to which the present invention pertains and who desire to observe such detailed step-by-step program statements may refer to Table I herein, which, as will be seen hereinafter, provides a complete listing of the program stored in the PROM 60 including the address, op code and programmer's comments to enable those having the aforementioned skill, to duplicate said program, to fully carry out the teaching of the invention as herein disclosed. By way of example, it will be seen that a portion of the program adjusts the reading to compensate for non-linearities inherent in a measurement utilizing a dual transducer. One major cause of such non-linearities is the spacing S between the transducers that tends to more substantially affect a nominal reading R for specimen thicknesses T less than about one-quarter inch. In such measurements, the present invention is designed to automatically adjust the linearity of the reading by correcting the nominal reading in accordance with a lookup table.

TABLE I

| PROGRAM ADDRESS | OP CODE | COMMENTS |
|---|---|---|
| 0000 | C4 | |
| 0001 | 68 | |
| 0002 | CF | |

| | | |
|---|---|---|
| 0003 | 08 | |
| 0004 | 03 | |
| 0005 | EF | |
| 0006 | 68 | |
| 0007 | C3 | Set Time Out Delay |
| 0008 | 0F | |
| 0009 | FF | |
| 000A | 68 | |
| 000B | C5 | Set Probe Blank Delay = 0 |
| 000C | 00 | |
| 000D | 00 | |
| 000E | 68 | |
| 000F | C7 | Set Initial Velocity Change Delta |
| 0010 | 00 | |
| 0011 | 04 | |
| 0012 | 92 | |
| 0013 | FA | Set Response Flag = 0 |
| 0014 | F0 | |
| 0015 | B2 | |
| 0016 | 3A | Test Lock Flag, If 1, go to E0 |
| 0017 | E0 | |
| 0018 | F8 | |
| 0019 | 00 | Set Lock Image = 00 |
| 001A | 73 | |
| 001B | 30 | Branch to E3 |
| 001C | E3 | |
| 001D | 7A | |
| 001E | 69 | Power Turn Off Subroutine |
| 001F | 00 | |

| | | |
|---|---|---|
| 0020 | 92 | ⎫ |
| 0021 | FA | ⎬ Get Lock Flag |
| 0022 | F0 | ⎭ |
| 0023 | 3A | ⎫ If Set, Do Not Test $\overline{EF3}$, $\overline{EF4}$, |
| | | ⎬ and NULL |
| 0024 | 60 | ⎭ |
| 0025 | 3F | ⎱ If $\overline{EF4}$ = 1, Test $\overline{EF3}$ |
| 0026 | 2A | |
| 0027 | 3E | ⎫ If $\overline{EF4}$ = 0 & $\overline{EF3}$ = 1, |
| | | ⎬ Decrease Velocity |
| 0028 | 44 | |
| 0029 | C8 | If $\overline{EF4}$ = 1 & $\overline{EF3}$ = 0, |
| | | Increase Velocity |
| 002A | 36 | |
| 002B | 30 | |
| 002C | 30 | |
| 002D | 57 | |
| 002E | -- | |
| 002F | -- | |
| 0030 | F8 | |
| 0031 | 1F | |
| 0032 | AF | |
| 0033 | EF | |
| 0034 | 87 | |
| 0035 | F4 | |
| 0036 | 73 | ⎬ Velocity Increase |
| 0037 | 97 | |
| 0038 | 74 | |
| 0039 | 73 | |

| | |
|---|---|
| 003A | 17 |
| 003B | 17 |
| 003C | 17 |
| 003D | 17 |
| 003E | 17 |
| 003F | 17 |
| 0040 | 30 |
| 0041 | 60 |
| 0042 | -- |
| 0043 | -- |
| 0044 | F8 |
| 0045 | 1F |
| 0046 | AF |
| 0047 | EF |
| 0048 | 87 |
| 0049 | F5 |
| 004A | 73 |
| 004B | 97 |
| 004C | 75 |
| 004D | 73 |
| 004E | 17 |
| 004F | 17 |
| 0050 | 17 |
| 0051 | 17 |
| 0052 | 17 |
| 0053 | 17 |
| 0054 | 30 |
| 0055 | 60 |
| 0056 | -- |

0044–0053: Velocity Decrease

| | | |
|---|---|---|
| 0057 | 68 | |
| 0058 | C7 | |
| 0059 | 00 | Initialize Velocity Change Register |
| 005A | 04 | |
| 005B | 30 | |
| 005D | -- | |
| 005E | -- | |
| 005F | -- | |
| 0060 | F8 | |
| 0061 | 00 | Set RAM At Unused Space |
| 0062 | AF | |
| 0063 | EF | |
| 0064 | 6A | |
| 0065 | FA | Input & Separate Bits 1 & 2 |
| 0066 | 03 | |
| 0067 | FB | Invert Bits 1 & 2 |
| 0068 | 03 | |
| 0069 | 3A | If D net 0, Skip Lock Section |
| 006A | 95 | |
| 006B | 30 | |
| 006C | 70 | |
| 006D | -- | |
| 006E | -- | |
| 006F | -- | |
| 0070 | 92 | |
| 0071 | FA | Separate Response Bit |
| 0072 | 0F | |

| | | |
|---|---|---|
| 0073 | 3A | If D Not Zero, Skip Next Section Because Response Has Been Made |
| 0074 | A0 | |
| 0075 | 22 | |
| 0076 | 82 | Delay Response For N Cycles |
| 0077 | 3A | |
| 0078 | A0 | |
| 0079 | 92 | |
| 007A | FB | Change Lock Flag |
| 007B | F0 | |
| 007C | F9 | |
| 007D | 0F | Set Response Flag |
| 007E | B2 | |
| 007F | F8 | |
| 0080 | 03 | Set RAM Pointer |
| 0081 | AF | |
| 0082 | 92 | Get Lock Flag |
| 0083 | FA | |
| 0084 | F0 | |
| 0085 | 3A | If Flag Set, Go to 8E |
| 0086 | 8E | |
| 0087 | F0 | |
| 0088 | FA | |
| 0089 | FD | Set Lock Flag = 0 |
| 008A | 5F | |
| 008B | 65 | |
| 008C | 30 | |
| 008D | A0 | |

| | | |
|---|---|---|
| 008E | F0 | |
| 008F | F9 | |
| 0090 | 02 | Set Lock Flag = 1 |
| 0091 | 5F | |
| 0092 | 65 | |
| 0093 | 30 | Branch to A0 |
| 0094 | A0 | |
| 0095 | 92 | |
| 0096 | FA | Set Response Marker = 0 |
| 0097 | F0 | |
| 0098 | B2 | |
| 0099 | F8 | |
| 009A | 20 | Set Delay Counter Time |
| 009B | A2 | |
| 009C | 30 | Branch to A0 |
| 009D | A0 | |
| 009E | -- | |
| 009F | -- | |
| 00A0 | F8 | |
| 00A1 | 00 | Set RAM Pointer |
| 00A2 | AF | |
| 00A3 | 6A | |
| 00A4 | FA | Input Velocity Display Bit |
| 00A5 | 01 | |
| 00A6 | 32 | If D = 0, Skip Velocity Display |
| 00A7 | D0 | |
| 00A8 | F8 | Set RAM Pointer At |
| 00A9 | 1E | Fraction Velocity |

| | | |
|---|---|---|
| 00AA | AF | |
| 00AB | EF | |
| 00AC | 72 | |
| 00AD | BA | Load Fractional Velocity Into Multiply Subroutine |
| 00AE | 72 | |
| 00AF | AA | |
| 00B0 | F8 | |
| 00B1 | 00 | |
| 00B2 | AC | |
| 00B3 | F8 | |
| 00B4 | 27 | Load 002710 Into Multiply Which Is 10,000 |
| 00B5 | BB | |
| 00B6 | F8 | This Changes Fractional Velocity To Whole |
| 00B7 | 10 | Number For Binary to BCD Subroutine |
| 00B8 | AB | |
| 00B9 | 68 | |
| 00BA | C1 | |
| 00BB | 03 | Call Multiply Subroutine |
| 00BC | 10 | |
| 00BD | D1 | |
| 00BE | F8 | |
| 00BF | 0C | |
| 00C0 | AF | |
| 00C1 | 72 | |

| | | |
|---|---|---|
| 00C2 | BB | Load Multiply Results Into Binary to BCD |
| 00C3 | 72 | |
| 00C4 | AB | |
| 00C5 | 68 | |
| 00C6 | C5 | |
| 00C7 | 00 | Set Probe Delay Counter |
| 00C8 | 01 | |
| 00C9 | 68 | |
| 00CA | C4 | Set PRF Delay |
| 00CB | 04 | |
| 00CC | FF | |
| 00CD | C0 | |
| 00CE | 03 | Call Binary to BCD & Output |
| 00CF | 58 | |
| 00D0 | C0 | |
| 00D1 | 01 | Long Branch to 0100 |
| 00D2 | 00 | |
| 00D3 | -- | |
| 00D4 | -- | |
| 00D5 | -- | |
| 00D6 | -- | |
| 00D7 | -- | |
| 00D8 | -- | |
| 00D9 | -- | |
| 00DA | -- | |
| 00DB | -- | |
| 00DC | -- | |

| | | |
|---|---|---|
| 00DD | -- | |
| 00DE | -- | |
| 00DF | -- | |
| 00E0 | F8 ⎫ | |
| 00E1 | 02 ⎬ | Set Lock Flag Image in RAM = 1 |
| 00E2 | 73 ⎭ | |
| 00E3 | F8 ⎫ | |
| 00E4 | 00 ⎬ | Set PRF = 00 |
| 00E5 | A4 | |
| 00E6 | B4 ⎭ | |
| 00E7 | C0 ⎫ | |
| 00E8 | 04 ⎬ | Go To Probe Blank |
| 00E9 | 60 ⎭ | |
| 00EA | -- | |
| 00EB | -- | |
| 00EC | -- | |
| 00ED | -- | |
| 00EE | -- | |
| 00EF | -- | |
| 00F0 | -- | |
| 00F1 | -- | |
| 00F2 | -- | |
| 00F3 | -- | |
| 00F4 | -- | |
| 00F5 | -- | |
| 00F6 | -- | |
| 00F7 | -- | |
| 00F8 | -- | |
| 00F9 | -- | |

| | | |
|---|---|---|
| 00FA | -- | |
| 00FB | -- | |
| 00FC | -- | |
| 00FD | -- | |
| 00FE | -- | |
| 00FF | -- | |
| PROGRAM ADDRESS | OP CODE | COMMENTS |
| 0100 | 7A | Reset Q |
| 0101 | 68 | |
| 0102 | CF | Set RAM Pointer |
| 0103 | 08 | |
| 0104 | 0D | |
| 0105 | 68 | |
| 0106 | C6 | Set 1st Time Marker & Integration Counter |
| 0107 | 00 | |
| 0108 | A0 | |
| 0109 | EF | |
| 010A | F8 | |
| 010B | 00 | |
| 010C | 73 | |
| 010D | 73 | |
| 010E | 73 | Zero Integrator |
| 010F | 73 | |
| 0110 | 73 | |
| 0111 | AC | |
| 0112 | BC | |

| | | |
|---|---|---|
| 0113 | 68 | Disable Counter Interrupt |
| 0114 | 0D | |
| 0115 | 3D | Pause Until PRF Goes Low |
| 0116 | 15 | |
| 0117 | F8 | |
| 0118 | FF | Load Full Scale Into Counter |
| 0119 | 68 | |
| 011A | 06 | |
| 011B | 68 | Turn On Counter |
| 011C | 05 | |
| 011D | 35 | Pause Until PRF Goes High |
| 011E | 1D | |
| 011F | F8 | |
| 0120 | 09 | Set RAM Pointer |
| 0121 | AF | |
| 0122 | 68 | Transfer Last Input Into Storage |
| 0123 | 6E | |
| 0124 | 2F | Decrement R(x) |
| 0125 | C4 | |
| 0126 | C4 | |
| 0127 | C4 | Wait For Counting |
| 0128 | C4 | |
| 0129 | C4 | |
| 012A | C4 | |
| 012B | 68 | Stop Counter |
| 012C | 00 | |
| 012D | 6A | Input LSB'S |
| 012E | FA | Separate 4 LSB'S |
| 012F | F0 | |

| | | |
|---|---|---|
| 0130 | 73 ⎫ | Store LSB'S & Decrement |
| | ⎬ | R(x) to 080A |
| 0131 | AD ⎭ | R(D.0) |
| 0132 | 68 ⎫ | Get Counter |
| 0133 | 08 ⎭ | |
| 0134 | FB ⎫ | Invert Counter |
| | ⎬ | (Counter Counts Down) |
| 0135 | FF ⎭ | |
| 0136 | 5F ⎫ | Store MSB'S |
| 0137 | BD ⎭ | |
| 0138 | 7B | Set Q ( Delay PRF & Reset Counters) |
| 0139 | FF ⎫ | Subtract 8 MSB'S Minus Upper Limit |
| 013A | 80 ⎭ | |
| 013B | 33 ⎫ | |
| 013C | EC ⎬ | If Results Positive, Go To Test Failed |
| 013D | 1F ⎭ | |
| 013E | C4 | |
| 013F | C4 | |
| 0140 | 96 ⎫ | 0 = First Time 1 = Normal INT. |
| 0141 | 32 ⎬ | If First Time thru -Skip Test |
| 0142 | 5E ⎭ | |
| 0143 | 8E ⎫ | |
| 0144 | F7 | |
| 0145 | 2F | |
| 0146 | 9E ⎬ | Subtract D -Memory |
| 0147 | 77 | |
| 0148 | 1F ⎭ | |

| | | |
|---|---|---|
| 0149 | 33 | If Positive Result, Go On |
| 014A | 50 | |
| 014B | 8E | |
| 014C | F5 | |
| 014D | 2F | Subtract Memory −D |
| 014E | 9E | |
| 014F | 75 | |
| 0150 | 3A | If D Not Zero, Go To Test Failed |
| 0151 | EC | |
| 0152 | 9C | |
| 0153 | 3A | Get Cpl Marker If Not 0, Skip Setting Flag |
| 0154 | 5E | |
| 0155 | F8 | |
| 0156 | 03 | Set RAM Pointer |
| 0157 | AF | |
| 0158 | BC | Set Cpl Marker |
| 0159 | F0 | Load |
| 015A | F9 | |
| 015B | 01 | Force Cpl Marker = 1 |
| 015C | 5F | |
| 015D | 65 | Update Display Annunciators |
| 015E | F8 | |
| 015F | 0D | |
| 0160 | AF | Set RAM Pointer and First Time Marker |
| 0161 | B6 | |
| 0162 | 9D | Get High Bits |

| | | |
|---|---|---|
| 0163 | F6 ⎫ | Shift Right Twice |
| 0164 | F6 ⎭ | |
| 0165 | C4 | |
| 0166 | C4 | |
| 0167 | A4 | |
| 0168 | 32 ⎫ | If D = 0 Go To 6E |
| 0169 | 6E ⎭ | |
| 016A | 24 ⎫ | |
| 016B | 84 ⎬ | Time Delay Dependent On Measurement Range |
| 016C | 3A | |
| 016D | 6A ⎭ | |
| 016E | 7A | Reset Q Energizing Timing Sequence |
| 016F | 8D | |
| 0170 | F4 | |
| 0171 | 73 | |
| 0172 | 9D | |
| 0173 | 74 | |
| 0174 | 73 ⟩ | Add Present Input Into Integrator |
| 0175 | 8C | |
| 0176 | 74 | |
| 0177 | 73 | |
| 0178 | 26 ⎫ | Test Number Of Samples For 160 |
| 0179 | 86 ⎬ | If Not, Go To Another Measurement |
| 017A | 3A | |
| 017B | 15 ⎭ | |
| 017C | 7B | Set Q Stopping PRF |

| | | |
|---|---|---|
| 017D | 30 | Branch to 85 |
| 017E | 85 | |
| 017F | -- | |
| 0180 | -- | |
| 0181 | -- | |
| 0182 | -- | |
| 0183 | -- | |
| 0184 | -- | |
| 0185 | F8 | Set RAM Pointer at Integrator |
| 0186 | 0B | |
| 0187 | AF | |
| 0188 | EF | |
| 0189 | 72 | Move Integrator To Multiplier |
| 018A | AC | |
| 018B | 72 | |
| 018C | BB | |
| 018D | 72 | |
| 018E | AB | |
| 018F | F8 | Set Loops = 6 |
| 0190 | 06 | |
| 0191 | A6 | |
| 0192 | 8C | |
| 0193 | F6 | |
| 0194 | AC | |
| 0195 | 9B | |
| 0196 | 76 | Shift Input Right |
| 0197 | BB | |
| 0198 | 8B | |
| 0199 | 76 | |

| | | |
|---|---|---|
| 019A | AB | |
| 019B | 26 | |
| 019C | 86 | Repeat 6 Times |
| 019D | 3A | |
| 019E | 92 | |
| 019F | 92 | |
| 01A0 | FA | Separate Lock Flag |
| 01A1 | 80 | |
| 01A2 | 3A | If D Not Zero, Skip NULL Test & NULL Procedure |
| 01A3 | BC | |
| 01A4 | F8 | |
| 01A5 | 00 | Set RAM Pointer At Unused Space |
| 01A6 | AF | |
| 01A7 | 6A | |
| 01A8 | FA | Input & Separate NULL Command |
| 01A9 | 02 | |
| 01AA | 32 | If D = 0 Skip NULL |
| 01AB | BC | |
| 01AC | F8 | |
| 01AD | 1C | Set RAM Pointer |
| 01AE | AF | |
| 01AF | EF | |
| 01B0 | 8B | |
| 01B1 | FF | |
| 01B2 | 38 | |
| 01B3 | 73 | |
| 01B4 | 9B | Subtract Integrator Minus Reference NULL Constant |

| | | |
|---|---|---|
| 01B5 | 7F | |
| 01B6 | 04 | |
| 01B7 | 73 | |
| 01B8 | 8C | |
| 01B9 | 7F | |
| 01BA | 00 | |
| 01BB | 73 | |
| 01BC | F8 | |
| 01BD | 1C | Set RAM Pointer |
| 01BE | AF | |
| 01BF | EF | |
| 01C0 | 8B | |
| 01C1 | F7 | |
| 01C2 | AB | |
| 01C3 | 2F | |
| 01C4 | 9B | Subtract NULL Value From Integrator |
| 01C5 | 77 | |
| 01C6 | BB | |
| 01C7 | 2F | |
| 01C8 | 8C | |
| 01C9 | 77 | |
| 01CA | AC | |
| 01CB | F8 | |
| 01CC | 1E | |
| 01CD | AF | |
| 01CE | EF | |
| 01CF | 72 | Load Velocity Into Multiplier |

| | | |
|---|---|---|
| 01D0 | BA | |
| 01D1 | 72 | |
| 01D2 | AA | |
| 01D3 | 68 | |
| 01D4 | C1 | Set Multiply Subroutine & Call |
| 01D5 | 03 | |
| 01D6 | 10 | |
| 01D7 | D1 | |
| 01D8 | C0 | |
| 01D9 | 02 | Go To Linearity Correction |
| 01DA | 00 | |
| 01DB | -- | |
| 01DC | -- | |
| 01DD | -- | |
| 01DE | -- | |
| 01DF | -- | |
| 01E0 | -- | |
| 01E1 | -- | Set Probe Delay Constant |
| 01E2 | -- | |
| 01E3 | -- | |
| 01E4 | -- | |
| 01E5 | -- | Go To BCD & Output |
| 01E6 | -- | |
| 01E7 | -- | |
| 01E8 | -- | |
| 01E9 | -- | |
| 01EA | -- | (Test Failed Section) |

| | | |
|---|---|---|
| 01EB | -- | |
| 01EC | 68 | |
| 01ED | C4 | Set PRF Delay |
| 01EE | 01 | |
| 01EF | FE | |
| 01F0 | C0 | |
| 01F1 | 04 | Go to Blank Routine |
| 01F2 | 60 | |
| 01F3 | -- | |
| 01F4 | -- | |
| 01F5 | -- | |
| 01F6 | -- | |
| 01F7 | -- | |
| 01F8 | -- | |
| 01F9 | -- | |
| 01FA | -- | |
| 01FB | -- | |
| 01FC | -- | |
| 01FD | -- | |
| 01FE | -- | |
| 01FF | -- | |
| 0200 | F8 | |
| 0201 | 00 | |
| 0202 | AF | |
| 0203 | EF | Input English/Metric Bit |
| 0204 | 6A | Put in R8.1 |
| 0205 | FA | |
| 0206 | 04 | |
| 0207 | B8 | |

| | | |
|---|---|---|
| 0208 | F8 | Set RAM Pointer |
| 0209 | 0D | English 1024 = 0400 |
| | | Metric 2601 = 0A29 |
| 020A | AF | |
| 020B | 98 | |
| 020C | 32 | If R8.1 = 0 (Metric) Go to 11 |
| 020D | 11 | |
| 020E | F8 | Load LSB's for Subtraction From Limit |
| 020F | 00 | |
| 0210 | C8 | Skip Next Two Instructions |
| 0211 | F8 | Load LSB's of Metric Limit |
| 0212 | 29 | |
| 0213 | F7 | Subtract LSB's Magnitude in |
| 0214 | A9 | |
| 0215 | 2F | |
| 0216 | 98 | R(9.1) (R9.0) |
| 0217 | 32 | Subtract MSB's |
| 0218 | 1C | |
| 0219 | F8 | |
| 021A | 04 | |
| 021B | C8 | |
| 021C | F8 | |
| 021D | 0A | |
| 021E | 77 | |
| 021F | B9 | |
| 0220 | 3B | If Results Negative Skip Correction |
| 0221 | 5A | |

| | | |
|---|---|---|
| 0222 | 98 | |
| 0223 | 32 | Get Metric Flag and If 0 |
| | | Go To 80 For Metric |
| 0224 | 80 | |
| 0225 | 89 | Difference Between Limit & |
| 0226 | FE | Thickness |
| 0227 | A9 | Is Contained in R(9.1) R(9.0) |
| 0228 | 99 | Max number is 1023 |
| 0229 | 7E | or 10 bits - Went |
| 022A | B9 | to Look-Up Correction |
| 022B | 89 | in Table |
| 022C | FE | Shift Difference |
| 022D | A9 | Left 2 Bits |
| 022E | 99 | |
| 022F | 7E | |
| 0230 | B9 | |
| 0231 | FA | |
| 0232 | 08 | Test Exhibit = 0 Go To Correction |
| 0233 | 32 | |
| 0234 | 4A | |
| 0235 | 89 | |
| 0236 | FE | |
| 0237 | A9 | Shift Left & Subtract 08 |
| 0238 | 99 | from MSB's |
| 0239 | 7E | |
| 023A | FF | |
| 023B | 08 | |
| 023C | B9 | |

| Addr | Val | Comment |
|------|-----|---------|
| 023D | 99  | |
| 023E | FA  | |
| 023F | 10  | |
| 0240 | 32  | If D = 0 Go To Output 10/16 |
| 0241 | 4A  | from MSB's |
| 0242 | 89  | |
| 0243 | FE  | |
| 0244 | A9  | |
| 0245 | 99  | Shift Left 1 bit & Subtract |
| 0246 | 7E  | |
| 0247 | FF  | |
| 0248 | 10  | |
| 0249 | B9  | |
| 024A | 99  | |
| 024B | AE  | |
| 024C | F8  | |
| 024D | 05  | |
| 024E | BE  | Subtract out Correction |
| 024F | F8  | |
| 0250 | 0D  | |
| 0251 | AF  | |
| 0252 | EF  | |
| 0253 | 0E  | |
| 0254 | F5  | |
| 0255 | 73  | |
| 0256 | F8  | |
| 0257 | 00  | |
| 0258 | 75  | |
| 0259 | 73  | |

| | | |
|---|---|---|
| 025A | F8 | ⎫ |
| 025B | 0C | ⎪ |
| 025C | AF | ⎬ Load Binary to BCD |
| 025D | EF | ⎪ |
| 025E | 72 | ⎪ |
| 025F | BB | ⎪ |
| 0260 | 72 | ⎭ |
| 0261 | AB | |
| 0262 | 68 | |
| 0263 | C5 | |
| 0264 | 01 | |
| 0265 | FF | |
| 0266 | C0 | |
| 0267 | 03 | |
| 0268 | 58 | |
| 0269 | -- | |
| 026A | -- | |
| 026B | -- | |
| 026C | -- | |
| 026D | -- | |
| 026E | -- | |
| 026F | -- | |
| 0270 | -- | |
| 0271 | -- | |
| 0272 | -- | |
| 0273 | -- | |
| 0274 | -- | |
| 0275 | -- | |
| 0276 | -- | |

| | | |
|---|---|---|
| 0277 | -- | |
| 0278 | -- | |
| 0279 | -- | |
| 027A | -- | |
| 027B | -- | |
| 027C | -- | |
| 027D | -- | |
| 027E | -- | |
| 027F | -- | |
| 0280 | 89 | |
| 0281 | FE | |
| 0282 | A9 | |
| 0283 | 99 | |
| 0284 | 7E | Shift Ditto (Metric Full Scale = A28) |
| 0285 | B9 | Left Twice (So use 12 Bits) |
| 0286 | 89 | |
| 0287 | FE | Magnitude in R(9.1) R(9.0) |
| 0288 | A9 | |
| 0289 | 99 | |
| 028A | 7E | |
| 028B | B9 | |
| 028C | 99 | |
| 028D | FA | Get Bits 11 & 12 (Test for lower 1/3 of Range) |
| 028E | 30 | |
| 028F | 32 | If Bits are 0 Go to Lookup |
| 0290 | BA | |

| | | |
|---|---|---|
| 0291 | 89 | |
| 0292 | FE | |
| 0293 | A9 | |
| 0294 | 99 | |
| 0295 | 7E | |
| 0296 | B9 | |
| 0297 | FA | |
| 0298 | 40 | |
| 0299 | 3A | If Bit 2048 is Not 0 Go to Shift Again |
| 029A | B0 | |
| 029B | 99 | |
| 029C | FA | Set Correct Address of Metric Lookup |
| 029D | 1F | |
| 029E | FC | |
| 029F | 10 | |
| 02A0 | B9 | |
| 02A1 | 30 | Go to BA |
| 02A2 | BA | |
| 02A3 | -- | |
| 02A4 | -- | |
| 02A5 | -- | |
| 02A6 | -- | |
| 02A7 | -- | |
| 02A8 | -- | |
| 02A9 | -- | |
| 02AA | -- | |
| 02AB | -- | |
| 02AC | -- | |

| | | |
|---|---|---|
| 02AD | -- | |
| 02AE | -- | |
| 02AF | -- | |
| 02B0 | 89 ⎤ | |
| 02B1 | FE | |
| 02B2 | A9 | |
| 02B3 | 99 ⎬ | Shift Left 1 More Time & |
| 02B4 | 7E | Blank Upper 2 Bits |
| 02B5 | FA | |
| 02B6 | 3F ⎦ | |
| 02B7 | FC ⎤ | |
| 02B8 | 30 ⎬ | Set Initial Lookup Address for |
| 02B9 | B9 | Upper 1/3 of Table |
| 02BA | 99 | |
| 02BB | FC | |
| 02BC | 40 | |
| 02BD | B9 ⎦ | |
| 02BE | 30 | Go To Correction Section |
| 02BF | 4A | |
| 0300 | 7E ⎤ | |
| 0303 | 30 | |
| 0302 | 6D | |
| 0303 | 79 | |
| 0304 | 33 | |
| 0305 | 5B ⎬ | |
| 0306 | 5F | BCD -7 Segment Look-Up |
| 0307 | 70 | |
| 0308 | 7F | |
| 0309 | 7B ⎦ | |

| Address | Code | Comment |
|---|---|---|
| 030A | -- | |
| 030B | -- | |
| 030C | -- | |
| 030D | -- | |
| 030E | -- | |
| 030F | -- | |
| 0310 | F8 | Multiply Subroutine 24 Bits x 16 Bits |
| 0311 | 0F | Set RAM Pointer |
| 0312 | AF | |
| 0313 | EF | |
| 0314 | F8 | |
| 0315 | 00 | |
| 0316 | 73 | |
| 0317 | 73 | |
| 0318 | 73 | Initialize (00) All Registers |
| 0319 | 73 | |
| 031A | 73 | |
| 031B | AD | |
| 031C | BC | |
| 031D | B9 | |
| 031E | F8 | Set Counter = 16 |
| 031F | 10 | |
| 0320 | A9 | |
| 0321 | F8 | |
| 0322 | 0F | Set RAM Pointer = 0F |
| 0323 | AF | |
| 0324 | 9A | |
| 0325 | F6 | |

| | | |
|---|---|---|
| 0326 | BA | Shift 16 Bits Right |
| 0327 | 8A | |
| 0328 | 76 | |
| 0329 | AA | |
| 032A | 3B | If DF = 0 Do Not Add Into Accumulator |
| 032B | 3B | |
| 032C | 8B | |
| 032D | F4 | |
| 032E | 73 | |
| 032F | 9B | |
| 0330 | 74 | Add 40 Bits Into Accumulator |
| 0331 | 73 | |
| 0332 | 8C | |
| 0333 | 74 | |
| 0334 | 73 | |
| 0335 | 9C | |
| 0336 | 74 | |
| 0337 | 73 | |
| 0338 | 8D | |
| 0339 | 74 | |
| 033A | 73 | |
| 033B | 29 | Decrement Counter |
| 033C | 89 | Get Counter |
| 033D | 32 | If = 0 Multiply Is Complete & Go To 50 |
| 033E | 50 | |
| 033F | 8B | |

| | | |
|---|---|---|
| 0340 | FE | |
| 0341 | AB | |
| 0342 | 9B | |
| 0343 | 7E | |
| 0344 | BB | |
| 0345 | 8C | |
| 0346 | 7E | |
| 0347 | AC | Shift 5 Register Left 1 Place |
| 0348 | 9C | |
| 0349 | 7E | |
| 034A | BC | |
| 034B | 8D | |
| 034C | 7E | |
| 034D | AD | |
| 034E | 30 | Return For Another Bit |
| 034F | 21 | |
| 0350 | D0 | |
| 0351 | -- | |
| 0352 | -- | |
| 0353 | -- | |
| 0354 | | 16 Bit Binary To BCD Conversion |
| 0355 | -- | |
| 0356 | -- | |
| 0357 | -- | |
| 0358 | F8 | |
| 0359 | 00 | |
| 035A | AD | |
| 035B | BD | Zero Registers |

| | | |
|---|---|---|
| 035C | AC | |
| 035D | BC | |
| 035E | BA | |
| 035F | F8 | |
| 0360 | 10 | Set Counter = (16) |
| 0361 | AA | |
| 0362 | BB | |
| 0363 | FE | |
| 0364 | AB | |
| 0365 | 9B | |
| 0366 | 7E | |
| 0367 | BB | |
| 0368 | 8C | Shift Left 5 Registers |
| 0369 | 7E | |
| 036A | AC | |
| 036B | 9C | |
| 036C | 7E | |
| 036D | BC | |
| 036E | 8D | |
| 036F | 7E | |
| 0370 | AD | |
| 0371 | 2A | Decrement Counter & If Zero, Go To End |
| 0372 | 8A | Get Counter = If 0, Go To End |
| 0373 | 32 | If D = 0, Complete & Go On |
| 0374 | A3 | |
| 0375 | 8C | |
| 0376 | FA | |
| 0377 | 0F | Get Digit 1 & Subt. 5 |

| | | |
|---|---|---|
| 0378 | FF | |
| 0379 | 05 | |
| 037A | 3B | If Results Neg. Digit Less Than 5 Go To Next Digit |
| 037B | 80 | |
| 037C | 8C | |
| 037D | FC | Digit 1 Greater Than 5 So Add 3 |
| 037E | 03 | |
| 037F | AC | |
| 0380 | 8C | |
| 0381 | FA | |
| 0382 | F0 | Get Digit 2 & Subt. 5 |
| 0383 | FF | |
| 0384 | 50 | |
| 0385 | 3B | If Results Neg. Go To |
| 0386 | 8B | |
| 0387 | 8C | |
| 0388 | FC | Add 3 To Digit 2 |
| 0389 | 30 | |
| 038A | AC | |
| 038B | 9C | |
| 038C | FA | |
| 038D | 0F | Get Digit 3 & Subt. 5 |
| 038E | FF | |
| 038F | 05 | |
| 0390 | 3B | If Results Neg. Go To |
| 0391 | 96 | |
| 0392 | 9C | |

| | | |
|---|---|---|
| 0393 | FC | Add 3 To Digit 3 |
| 0394 | 03 | |
| 0395 | BC | |
| 0396 | 9C | |
| 0397 | FA | |
| 0398 | F0 | Get Digit 4 & Subt. 5 |
| 0399 | FF | |
| 039A | 50 | |
| 039B | 3B | If Results Neg. Go To |
| 039C | A1 | |
| 039D | 9C | |
| 039E | FC | Add 3 To Digit 4 |
| 039F | 30 | |
| 03A0 | BC | Add 3 To Digit 4 |
| 03A1 | 30 | Branch to 62 |
| 03A2 | 62 | |
| 03A3 | D0 | |
| 03A4 | 8D | Get 5th Digit |
| 03A5 | 32 | If D = 0 Go To NO Shift Output |
| 03A6 | BA | |
| 03A7 | F8 | At This Point Digit 5 Was Not Zero So Must Determine 0 Less Than D5 Less Than 2 |
| 03A8 | 00 | |
| 03A9 | AF | |
| 03AA | EF | Input Data |
| 03AB | 6A | |
| 03AC | FA | Separate Eng/Met Bit |
| 03AD | 04 | |

| | | |
|---|---|---|
| 03AE | CA | If D Not 0 (English) Go To Overrange |
| 03AF | 04 | |
| 03B0 | B0 | |
| 03B1 | 8D | |
| 03B2 | FF | Get Digit 5 and Subtract 2 |
| 03B3 | 02 | |
| 03B4 | C3 | |
| 03B5 | 04 | If Not Negative Go To Overrange |
| 03B6 | B0 | |
| 03B7 | F8 | |
| 03B8 | 80 | Set Metric Marker |
| 03B9 | BD | |
| 03BA | 8C | |
| 03BB | FA | |
| 03BC | 0F | Separate BCD Digits |
| 03BD | AB | |
| 03BE | 8C | |
| 03BF | F6 | |
| 03C0 | F6 | |
| 03C1 | F6 | |
| 03C2 | F6 | |
| 03C3 | BB | |
| 03C4 | 9C | |
| 03C5 | FA | |
| 03C6 | 0F | |
| 03C7 | AC | |
| 03C8 | 9C | |

| | | |
|---|---|---|
| 03C9 | F6 | |
| 03CA | F6 | |
| 03CB | F6 | |
| 03CC | F6 | |
| 03CD | BC | |
| 03CE | F8 | |
| 03CF | 03 | Set R(E.1) = 03 |
| 03D0 | BE | |
| 03D1 | 9D | Get Marker |
| 03D2 | 32 | If D = 0 Go To English Output |
| 03D3 | E6 | |
| 03D4 | 9B | |
| 03D5 | AE | Convert RB.1 To 7 Segment & Place In R(B.0) |
| 03D6 | 0E | |
| 03D7 | AB | |
| 03D8 | 8C | |
| 03D9 | AE | |
| 03DA | 0E | |
| 03DB | BB | |
| 03DC | 9C | |
| 03DD | AE | Convert and Store BCD to 7 Segment |
| 03DE | 0E | |
| 03DF | AC | |
| 03E0 | 8D | |
| 03E1 | AE | |
| 03E2 | 0E | |

| | | |
|---|---|---|
| 03E3 | BC | |
| 03E4 | 30 | Branch to F6 |
| 03E5 | F6 | |
| 03E6 | 8B | |
| 03E7 | AE | |
| 03E8 | 0E | |
| 03E9 | AB | |
| 03EA | 9B | |
| 03EB | AE | |
| 03EC | 0E | Convert To 7 Segment |
| 03ED | BB | English Or Low Metric |
| 03EE | 8C | |
| 03EF | AE | |
| 03F0 | 0E | |
| 03F1 | AC | |
| 03F2 | 9C | |
| 03F3 | AE | |
| 03F4 | 0E | BCD Converted To 7 Segment Data |
| 03F5 | BC | Is Stored In R(C.1) R(C.0) R(B.1) R(B.0) |
| 03F6 | C0 | Ready For Output. Need To Set Decimal |
| 03F7 | 04 | Point & Output |
| 03F8 | 00 | |
| 03F9 | -- | |
| 03FA | -- | |
| 03FB | -- | |
| 03FC | -- | |
| 03FD | -- | |

| | | |
|---|---|---|
| 03FE | -- | |
| 03FF | -- | |
| 0400 | F8 | |
| 0404 | 00 | Set RAM Pointer |
| 0402 | AF | |
| 0404 | EF | |
| 0404 | 6A | |
| 0405 | FA | Input English/Metric Bit |
| 0406 | 04 | |
| 0407 | 32 | If D = 0 Go To Metric |
| 0408 | 1A | |
| 0409 | 6A | |
| 040A | FA | Input Velocity/Length Bit |
| 040B | 01 | |
| 040C | 32 | If D = 0 Go To Length |
| 040D | 14 | |
| 040E | 9C | |
| 040F | F9 | .9999 Output Eng. Velocity |
| 0410 | 80 | |
| 0411 | BC | |
| 0412 | 30 | Branch to 33 |
| 0413 | 33 | |
| 0414 | 8C | |
| 0415 | F9 | 9.999 Eng. Length |
| 0416 | 80 | |
| 0417 | AC | |
| 0418 | 30 | Branch to 33 |
| 0419 | 33 | |
| 041A | 6A | |

| Address | Code | Comment |
|---|---|---|
| 041B | FA | Input & Separate Length/Velocity Bit |
| 041C | 01 | |
| 041D | 32 | If D = 0 Go To 2A (Metric Length) |
| 041E | 2A | |
| 041F | 9D | Get Metric Shift Marker |
| 0420 | 3A | If D Not 0 If R(D.1) Not 0 Information is shifted |
| 0421 | 24 | |
| 0422 | 30 | Go To 9.999 Output |
| 0423 | 14 | |
| 0424 | 9B | |
| 0425 | F9 | 99.99 Output |
| 0426 | 80 | |
| 0427 | BB | |
| 0428 | 30 | Go On |
| 0429 | 33 | |
| 042A | 9D | |
| 042B | 3A | If D Not 0 (Long) |
| 042C | 2F | |
| 042D | 30 | Go To 24 |
| 042E | 24 | |
| 042F | 8B | |
| 0430 | F9 | 999.9 Output |
| 0431 | 80 | |
| 0432 | AB | |
| 0433 | F8 | |
| 0434 | 20 | Set Converter = 32 |
| 0435 | AD | |

| | | |
|---|---|---|
| 0436 | 9C | |
| 0437 | F6 | |
| 0438 | BC | |
| 0439 | 8C | |
| 043A | 76 | Right Shift 32 Bits |
| 043B | AC | |
| 043C | 9B | |
| 043D | 76 | |
| 043E | BB | |
| 043F | 8B | |
| 0440 | 76 | |
| 0441 | AB | |
| 0442 | 33 | If DF = 1 Go To Set Q |
| 0443 | 46 | |
| 0444 | 7A | Reset Q |
| 0445 | 38 | Skip Next Instruction |
| 0446 | 7B | Set Q |
| 0447 | 6E | Clock Out Serial Infor. |
| 0448 | 7B | Set Q |
| 0449 | 2D | Get R(D.0) |
| 044A | 8D | If D Not 0 Go To 36 |
| 044B | 3A | |
| 044C | 36 | |
| 044D | F8 | |
| 044E | 03 | Output Annunciator Image |
| 044F | AF | |
| 0450 | EF | |
| 0451 | 65 | |

| Address | Code | Comment |
|---|---|---|
| 0452 | 68 | Set Power Time Out Constant |
| 0453 | C3 | |
| 0454 | 04 | |
| 0455 | FF | |
| 0456 | 94 | Time Delay |
| 0457 | CE | |
| 0458 | 24 | |
| 0459 | 94 | |
| 045A | 3A | |
| 045B | 56 | |
| 045C | D0 | |
| 045D | C0 | Long Branch To Beginning |
| 045E | 00 | |
| 045F | 20 | |
| 0460 | F8 | Set ROM Pointer At Annunciator Image |
| 0461 | 03 | |
| 0462 | AF | |
| 0463 | EF | |
| 0464 | 0F | Load |
| 0465 | FA | Set Cple Bit = 0 "AND" D With FE |
| 0466 | FE | |
| 0467 | 5F | Restore & Output To Turn "OFF" Cple |
| 0468 | C4 | |
| 0469 | 65 | |
| 046A | 23 | Decrement R(3) |
| 046B | 93 | Get R(3.1) |
| 046C | C2 | If D = 0 Go To Power Off Routine |

| | | |
|---|---|---|
| 046D | 00 | |
| 046E | 1D | |
| 046F | 95 | |
| 0470 | CE | |
| 0471 | 25 | Test For End Of Reading Hold Delay |
| 0472 | 95 | |
| 0473 | 3A | |
| 0474 | 9C | |
| 0475 | F8 | |
| 0476 | 49 | |
| 0477 | AB | Load 49 Into Registers For Serial Output |
| 0478 | BB | |
| 0479 | AC | |
| 047A | BC | |
| 047B | F8 | |
| 047C | 20 | Set Shift Counter = 32 Times |
| 047D | AA | |
| 047E | 9C | |
| 047F | F6 | |
| 0480 | BC | |
| 0481 | 8C | |
| 0482 | 76 | |
| 0483 | AC | |
| 0484 | 9B | |
| 0485 | 76 | Shift 32 Bits Right |
| 0486 | BB | |
| 0487 | 8B | |

| | | |
|---|---|---|
| 0488 | 76 | |
| 0489 | AB | |
| 048A | 33 | If DF = 1 Go To Set Q |
| 048B | 8E | |
| 048C | 7A | Reset Q |
| 048D | 38 | Skip Next Instruction |
| 048E | 7B | Set Q |
| 048F | 6E | Clock Serial Data Out |
| 0490 | 7B | Set Q To Stop PRF Counter |
| 0491 | 2A | Decrement Counter |
| 0492 | C4 | |
| 0493 | 8A | & If Not Complete 32 Shifts Return |
| 0494 | 3A | & Do Another Cycle |
| 0495 | 7E | |
| 0496 | F8 | |
| 0497 | 03 | |
| 0498 | AF | When Complete Output Annunciator Image |
| 0499 | EF | |
| 049A | 65 | |
| 049B | C4 | |
| 049C | 94 | |
| 049D | CE | PRF Delay |
| 049E | 24 | |
| 049F | 94 | |
| 04A0 | 3A | |
| 04A1 | 9C | |
| 04A2 | D0 | |
| 04A3 | C0 | |

| Address | Op Code | Comments |
|---|---|---|
| 04A4 | 00 | Long Branch To Beginning |
| 04A5 | 20 | |
| 04A6 | -- | |
| 04A7 | -- | |
| 04A8 | -- | |
| 04A9 | -- | |
| 04AA | -- | |
| 04AB | -- | |
| 04AC | -- | |
| 04AD | -- | |
| 04AE | -- | |
| 04AF | -- | |
| 04B0 | 68 | Overrange Output |
| 04B1 | CB | Load Register |
| 04B2 | 4F | |
| 04B3 | 77 | |
| 04B4 | 68 | |
| 04B5 | CC | Load Register |
| 04B6 | 7E | |
| 04B7 | 3E | |
| 04B8 | 68 | |
| 04B9 | C5 | |

TABLE I Continued

| PROGRAM ADDRESS | OP CODE | COMMENTS |
|---|---|---|
| 04BA | 00 | Set Probe Delay = 0 |

| | | |
|---|---|---|
| 04BB | 00 ⎫ | |
| 04BC | 30 ⎬ | Go To Output Routine |
| 04BD | 33 ⎭ | |
| 04BE | | |
| 04BF | | |
| 0500 | 01 | |
| 0501 | 01 | |
| 0505 | 02 | English Look Up Correction |
| 0503 | 02 | |
| 0504 | 03 | Tables |
| 0505 | 04 | |
| 0506 | 05 | |
| 0507 | 06 | |
| 0508 | 07 | |
| 0509 | 08 | |
| 050A | 09 | |
| 050B | 09 | |
| 050C | 0A | |
| 050D | 0A | |
| 050E | 0B | |
| 050F | 0C | |
| 0510 | 0D | |
| 0511 | 0D | |
| 0512 | 0E | |
| 0513 | 0E | |
| 0514 | 0F | |
| 0515 | 10 | |
| 0516 | 10 | |
| 0517 | 11 | |
| 0518 | 12 | |

| | |
|---|---|
| 0519 | 13 |
| 051A | 14 |
| 051B | 14 |
| 051C | 15 |
| 051D | 16 |
| 051E | 17 |
| 051F | 18 |
| 0520 | -- |
| 0521 | -- |
| 0522 | -- |
| 0523 | -- |
| 0524 | -- |
| 0525 | -- |
| 0526 | -- |
| 0527 | -- |
| 0528 | -- |
| 0529 | -- |
| 052A | -- |
| 052B | -- |
| 052C | -- |
| 052D | -- |
| 052E | -- |
| 052F | -- |
| 0530 | -- |
| 0531 | -- |
| 0532 | -- |
| 0533 | -- |
| 0534 | -- |
| 0535 | -- |

| | |
|---|---|
| 0536 | -- |
| 0537 | -- |
| 0538 | -- |
| 0539 | -- |
| 053A | -- |
| 053B | -- |
| 053C | -- |
| 053D | -- |
| 053E | -- |
| 053F | -- |
| 0540 | 00 |
| 0541 | 01 |
| 0542 | 01 |
| 0543 | 02 |
| 0544 | 03 |
| 0545 | 03 |
| 0546 | 04 |
| 0547 | 05 |
| 0548 | 05 |
| 0549 | 06 |
| 054A | 07 |
| 054B | 08 |
| 054C | 08 |
| 054D | 09 |
| 054E | 0A |
| 054F | 0B |
| 0550 | 0C |
| 0551 | 0D |
| 0552 | 0D |
| 0553 | 0E |

Metric Look-Up Correction

Tables

| | | |
|---|---|---|
| 0554 | 0E | |
| 0555 | 0F | |
| 0556 | 0F | |
| 0557 | 10 | |
| 0558 | 10 | |
| 0559 | 11 | |
| 055A | 12 | |
| 055B | 12 | |
| 055C | 13 | Load Binary to BCD |
| 055D | 14 | |
| 055E | 14 | |
| 055F | 15 | |
| 0560 | 16 | |
| 0561 | 16 | |
| 0562 | 17 | |
| 0563 | 18 | |
| 0564 | 18 | |
| 0565 | 19 | |
| 0566 | 1A | |
| 0567 | 1B | |
| 0568 | 1B | |
| 0569 | 1C | |
| 056A | 1D | |
| 056B | 1E | |
| 056C | 1F | |
| 056D | 20 | |
| 056E | 21 | |
| 056F | 22 | |
| 0570 | 23 | |

| | |
|---|---|
| 0571 | 24 |
| 0572 | 24 |
| 0573 | 25 |
| 0574 | 25 |
| 0575 | 26 |
| 0576 | 27 |
| 0577 | 27 |
| 0578 | 28 |
| 0579 | 29 |
| 057A | 2A |
| 057B | 2B |
| 057C | 2B |
| 057D | 2C |
| 057E | 2D |
| 057F | 2D |
| 0580 | 2E |
| 0581 | 2F |
| 0582 | 30 |
| 0583 | 30 |
| 0584 | 31 |
| 0585 | 32 |
| 0586 | 33 |
| 0587 | 34 |
| 0588 | 35 |
| 0589 | 36 |
| 058A | 36 |
| 058B | 37 |
| 058C | 38 |
| 058D | 39 |

| | |
|---|---|
| 058E | 3A |
| 058F | 3B |
| 0590 | 3C |
| 0591 | 3D |
| 0592 | 3E |
| 0593 | 3F |
| 0594 | 40 |
| 0595 | -- |
| 0596 | -- |
| 0597 | -- |
| 0598 | -- |
| 0599 | -- |
| 059A | -- |
| 059B | -- |
| 059C | -- |
| 059D | -- |
| 059E | -- |
| 059F | -- |

As shown in FIG. 7 the program commences when power is applied to the gage of the present invention by depression of ON switch 28 resulting in automatically loading all registers within the microprocessor 44 with the initial set up data as specified in the detailed listing. The program then determines whether the lock flag is set. The lock flag is set as previously noted when switches 28 and 30 have been depressed simultaneously for several seconds so that the user can be assured that neither velocity nor null settings previously entered have been inadvertently disturbed. If the lock flag has not been set, the program then tests whether the velocity increase flag has been set by the user depressing switch 32 for the purpose of increasing velocity data. If the velocity increase flag has been set, the program then increases or increments the contents of the velocity register. On the other hand, if the velocity increase flag has not been set, the program then tests whether or not the velocity decrease flag has been set by depression of switch 34, and if it has, the velocity register is decremented accordingly. Of course, if the lock flag had been previously set indicating that there are no changes to be made to the velocity data, the velocity tests are bypassed as shown in the flow diagram of FIG. 7.

The program next tests to determine whether both the null and velocity switches have been set simultaneously. If such simultaneous selection of these two switches has occurred, this would indicate that the user has decided to either lock a previously unlocked switch configuration or to unlock a previously locked switch configuration. In either case, after a suitable time delay, the condition of the lock flag is changed and a response flag is set equal to 1 to indicate that this change has occurred. On the other hand, if both the null and velocity switches have not been set simultaneously, the lock flag remains unchanged and the response flag is set equal to 0.

The program next determines whether the velocity display switch 28 has been set. If it has, the velocity number stored in the microprocessor in a fractional format is multiplied by 10,000, converted from binary to BCD format and then from BCD to 7-segment format, and the display is updated to provide the user with the most recent velocity information. Then after a suitable delay, the program recycles through the lock flag and velocity tests previously described.

Thus it will be seen that the program described to this point is designed to provide the user with a display of velocity and to change the velocity setting as appropriate for the particular material with which the invention is to be used. In addition, in this particular loop of the program, the user has the option at any time of locking in the velocity data that he has entered when he has reached the figure that is appropriate for the material under test. Of course, when the velocity figure desired by the user has been reached, he no longer depresses the velocity switch and the program determines that the velocity display switch has not been set, and instead proceeds on to perform the measurement.

To actually perform the measurement, the program sets a loop counter equal to 160. This is the actual number of times that a count will be measured for each particular measurement of the thickness of a test specimen. In addition, an integrator which accumulates these counts internal to microprocessor 44, is zeroed and a first time measurement marker or flag is set, indicating that the next count about to be measured is the very first of the 160. The program next waits for the PRF high input signal indicating that an ultrasonic pulse has been transmitted and received and test data in the form of a count has been accumulated. The program next tests to determine whether the input data is over-range or not.

If the data is over-range, indicating that the test is not a valid one, a couple bar comprising a portion of the display is removed to indicate to the user that there is not a valid test underway. Then a power off register is decremented and tested to determine whether or not it has reached zero. If it in fact has reached zero, indicating that the instrument has not been used to conduct a valid test for a preselected period of time such as five or ten minutes, power to the instrument is turned off and the program is stopped. This will be recognized as a battery saving feature of the invention.

If the power off register has not been decremented to zero, a time delay register is decremented and then tested to determine whether it has reached zero. If it has, the display is blanked by replacing any data therein previously displayed, by one or more horizontal lines indicating to the user that the instrument is not currently displaying any useable data because a preselected period of time has passed since the last valid data has been accepted. On the other hand, if the time delay register has not yet been decremented to zero, the display remains unchanged. After a suitable time delay the program returns to the flag lock test step previously described with the display either blanked or maintained in its status quo condition depending on the status of the time delay register.

If the input is determined to be within range, the program then determines whether the first time marker has been set. As previously discussed, the first time marker indicates that this is the very first of the 160 tests that are performed in rapid succession for each measurement. If the first time marker had not been previously set, indicating that this is data derived from at least the second ultrasonic pulse echo test, the program then decides whether the count of the current test is similar to the count of the previous test. This comparison functions as a form of digital filtering to provide a means of rejecting data which is likely to be erroneous because the count differs from the previous count by greater than a pre-determined number. If in fact this has occurred, the program then removes the couple bar from display 24 and conducts the power off and time delay register tests as previously indicated for an over-range condition. If, on the other hand, the count is similar to the previous count, that is, it falls within a predetermined number of counts of maximum differential as compared to the previous count, the couple bar is set in display 24 to indicate to the user that the ongoing test is indeed a valid one. The digital filtering process of the count similarity test, as well as other details of the measurement computation, are disclosed in greater detail in applicant's copending patent application Ser. No. 284,761 filed July 20, 1981, now U.S. Pat. No. 4,413,518, the entire contents of which are incorporated herein by reference.

It will be observed in FIG. 8 that the couple bar is never set on the basis of the first data because if the first time marker has been set, the count similarity test and the couple bar setting operation are both bypassed. In either case, the next step in the program is to add the current data to the microprocessor's integrator and to reset the first time marker so that none of the additional data taken in the 160 counts comprising a single measurement will be erroneously regarded as the first such data. The program then decrements the loop counter and determines whether the loop counter has reached zero. If it has not reached zero, the program loops back to the wait for PRF high input operation to receive the subsequent count, perform the aforementioned tests for data validity and add that count to the integrator. This operation is recycled until the loop counter has reached zero indicating that the 160 count operations have been completed.

When the counting operation has been completed, the program then performs the operation necessary to accurately calculate the actual thickness of the test specimen. More specifically, as seen in FIG. 8, the program first tests to determine whether the lock flag has been set. If in fact the lock flag has not been set, the program next determines whether or not the null or zero switch 30 has been set. If the null switch has been set, the program next sets the null constant. The null constant is set by the user applying the transducer to reference specimen 26 incorporated into the front face of the case of the present invention. This reference, for example, may typically be an extremely accurate, known thickness, such as $\frac{1}{4}$ inch.

As seen further in FIG. 8, if the lock flag has been set, indicating that the null constant is not to be changed, or if the null switch has not been set, also indicating that the null constant is to remain the same, the set null constant operation is bypassed. In either case, the program next subtracts the null constant from the measured data contained in the integrator to correct the data for known time delays thereby accounting for the time of transition of the ultrasonic signal through the cables, connectors and transducers in making the measurement.

The program then multiplies the data by the velocity constant to produce a thickness output. This thickness output is then adjusted by means of a look-up table for non-linearity to account for inadvertent angular discrepancies that might otherwise arise when measuring relatively thin (less than $\frac{1}{4}$ inch) test specimens because of the lateral distance between the transmitting and receiving transducers. The adjusted thickness data is then converted from binary to BCD format and from BCD to seven-segment format and the display is updated to provide the user with a visual indication of the measured thickness using the present invention.

It will now be understood that the present invention comprises a novel microprocessor-controlled, handheld, digital ultrasonic thickness gage having automatic zero calibration and scroll adjustment of material velocity, as well as a unique electronic locking feature to prevent inadvertent calibration or velocity data variations. Another unique feature of the present invention is automatic compensation in the measurement for relatively thin specimens where the lateral displacement of dual transducer elements would otherwise cause non-linearity-induced measurement inaccuracies.

While the invention has been described with particular reference to general purpose programmable computers and permanently programmed read only memory units, it will be understood that many features of the system which are presently programmed in software form may be embodied in hardware form. Likewise, those parts of the system which have been described as utilizing hardware programs may be embodied in software program form.

For purposes of simplifying the explanation, language has been utilized which may sound like it is concerned with mental processes but which, in fact, is concerned with physical processes. For example, the term "data" and particularly where reference is made to storage and transport thereof, refers specifically to information signals and data signals or other manifestations of information and data which are capable of physical manipulation. In the embodiment of the invention described, the symbols in question are stored in the computer unit in a binary form in charged cells, such cells usually being charged in one direction to represent a value 1 in the binary system. The term "transfer of data" and similar expressions refer to the manipulation of those signals or manifestations.

It is to be understood that while the invention has been described with particular reference to signals in binary form, signals in other logic forms such as trinary form may be considered within the scope of this invention. Furthermore, it is to be understood that while binary signals described herein in conjunction with this invention are considered to be in a positive or TRUE state when in a constant voltage level such as +5 volts DC and are considered to be in a negative or FALSE state when in a constant voltage level such as 0 volts DC, the scope of this invention also includes binary signals, the states of which depend upon their direction of change from one voltage level to another.

Many details of the type which would be obviously supplied by one skilled in the art have been omitted. For example, physical layouts of circuit components and their interconnections have not all been described. All of these and other details are of such a nature that they can be supplied by any one skilled in the art of designing electronic apparatus and programming computers.

Although a particular preferred embodiment, including specified digital components and a step-by-step program, has been disclosed herein, those having skill in relevant arts will understand that there may be many alternative implementations of the invention to achieve the aforementioned advantageous features. Furthermore, it will now be apparent that as a result of applicant's teaching herein disclosed, various modifications and additions to both the hardware and software portions of the invention will occur to those of relevant skill. However, it is to be understood that all such alternative implementations, modifications and additions, are contemplated as being within the scope of the invention which is to be limited only by the claims appended hereto.

I claim:

1. An improved ultrasonic thickness gage of the type having a transmitter for transmitting an ultrasonic pulse through a transducer into a specimen under test, a receiver for receiving the echo pulse through a transducer from said specimen, a high frequency oscillator and digital counter, the counter accumulating pulse generated by the oscillator during the time period between transmitting and receiving the ultrasonic pulses and generating a count signal indicative of such time period, a device for storing a signal which represents the velocity of sound in a test specimen of the material and for calculating the thickness of the specimen by multiplying the time period signal by the velocity signal, and a display for displaying a visual indication of the calculated thickness; the improvement wherein said storing and calculating device comprises a microprocessor, and wherein said gage further comprises:
   a keyboard having at least one key for selectively changing said velocity signal in a desired direction to register a new velocity signal, and
   means in said microprocessor responsive to said velocity changing key for calculating said thickness based on said new velocity signal,
   wherein said keyboard comprises at least one key connected to said microprocessor for selectively locking and unlocking said velocity signal whereby said key for selectively changing said velocity signal is rendered ineffectual and effectual depending on the status of said locking key.

2. The improvement recited in claim 1 wherein said keyboard comprises two keys for selectively changing said velocity signal, one of said two keys being connected to said microprocessor for increasing said velocity signal and the other of said two keys being connected to said microprocessor for decreasing said velocity signal.

3. The improvement recited in claim 1 wherein said keyboard comprises a key for selectively displaying said velocity signal on said display.

4. The improvment recited in claim 1 wherein said keyboard comprises at least one additional key for calibrating said gage while applying said transducers to a reference specimen of preselected known thickness, and
   means in said microprocessor responsive to said additional key and to said reference specimen for calculating a null constant equal to the difference between the apparent measured thickness of said reference specimen and the known thickness of said reference specimen, whereby said null constant corresponds to measured time delay not attributable to the thickness of a specimen under test.

5. The improvement recited in claim 1 further comprising a data bus connected to said microprocessor for both putting in and taking out measurement data, and
   means for gaining external access to said data bus for transferring such data between said gage and another instrument.

6. The improvement recited in claim 1 further comprising means in said microprocessor for correcting inaccuracies in said thickness calculation, such inaccuracies being caused predominantly by the lateral displacement between said transmitting and receiving transducers on said specimen.

7. The improvement recited in claim 1 further comprising means in said microprocessor for removing power from said gage whenever no valid thickness measurement has occurred for a selected period of time.

8. The improvement recited in claim 1 further comprising means in said microprocessor for repeating said ultrasonic pulse and counter signal generation, a preselected plurality of times, and for calculating said thickness based upon an average of the entirety of said plurality of counter signals, and means for rejecting the thickness calculation whenever any such repeated counter signal differs from a prior counter signal for the same measurement by more than a preselected difference.

9. The improvement recited in claim 8 further comprising means in said microprocessor connected to said display for generating a couple bar indication on said display when said repeated count signals are within said preselected difference and for removing said couple bar indication whenever said preselected difference is exceeded.

10. An improved ultrasonic thickness gage of the type having a transmitter for transmitting an ultrasonic pulse through a transducer into a specimen under test, a receiver for receiving the echo pulse through a transducer from said specimen, a high frequency oscillator and digital counter, the counter accumulating pulses generated by the oscillator during the time period between transmitting and receiving the ultrasonic pulses and generating a count signal indicative of such time period, a device for storing a signal which represents the velocity of sound in a test specimen of the material and for calculating the thickness of the specimen by multiplying the time period signal by the velocity signal, and a display for displaying a visual indication of the calculated thickness; the improvement wherein said storing and calculating device comprises a microprocessor, and wherein said gage further comprises:

a keyboard having at least one key for calibrating said gage while applying said transducers to a reference specimen of preselected known thickness, and means in said microprocessor responsive to said key and to said reference specimen for calculating a null constant equal to the difference between the apparent measured thickness of said reference specimen and the known thickness of said reference specimen, whereby said null constant corresponds to measured time delay not attributable to the thickness of a specimen under test, wherein said keyboard comprises at least one key connected to said microprocessor for selectively locking and unlocking said calibrating key whereby said calibrating key is rendered ineffectual and effectual depending on the status of said locking key.

11. The improvement recited in claim 10 further comprising a data bus connected to said microprocessor for both putting in and taking out measurement data, and means for gaining external access to said data bus for transferring such data between said gage and another instrument.

12. The improvement recited in claim 10 further comprising means in said microprocessor for correcting inaccuracies in said thickness calculation, such inaccuracies being caused predominantly by the lateral displacement between said transmitting and receiving transducers on said specimen.

13. The improvement recited in claim 10 further comprising means in said microprocessor for removing power from said gage wherever no valid thickness measurement has occurred for a selected period of time.

14. The improvement recited in claim 10 further comprising means in said micoprocessor for repeating said ultrasonic pulse and counter signal generation, a preselected plurality of times, and for calculating said thickness based upon an average of the entirety of said plurality of counter signals, and means for rejecting the thickness calculation whenever any such repeated counter signal differs from a prior counter signal for the same measurement by more than a preselected difference.

15. The improvement recited in claim 14 further comprising means in said microprocessor connected to said display for generating a couple bar indication on said display when said repeated count signals are within said preselected difference and for removing said couple bar indication whenever said preselected difference is exceeded.

16. An improved ultrasonic thickness gage of the type having a transmitter for transmitting an ultrasonic pulse through a transducer into a specimen under test, a receiver for receiving the echo pulse through a transducer from said specimen, a high frequency oscillator and digital counter, the counter accumulating pulses generated by the oscillator during the time period between transmitting and receiving the ultrasonic pulses and generating a count signal indicative of such time period, a device for storing a signal which represents the velocity of sound in a test specimen of the material and for calculating the thickness of the specimen by multiplying the time period signal by the velocity signal, and a display for displaying a visual indication of the calculated thickness; the improvement wherein said storing and calculating device comprises a microprocessor, and wherein said gage further comprises:

a keyboard comprising two keys for selectively changing said velocity signal, one of said two keys being connected to said microprocessor for increasing said velocity signal and the other of said two keys being connected to said microprocessor for decreasing said velocity signal, means in said microprocessor responsive to said velocity changing keys for calculating said thickness based on said new velocity signal, said keyboard also having a key for selectively displaying said velocity signal on said display, said keyboard also having at least one additional key for calibrating said gage while applying said transducers to a reference specimen of preselected known thickness, and means in said microprocessor responsive to said additional key and to said reference specimen for calculating a null constant equal to the difference between the apparent measured thickness of said reference specimen and the known thickness of said reference specimen, whereby said null constant corresponds to measured time delay not attributable to the thickness of a specimen under test, said keyboard also also having one key connected to said microprocessor for selectively locking and unlocking said velocity signal whereby said keys for selectively changing said velocity signal are rendered ineffectual and effectual depending on the status of said locking key.

17. The improvement recited in claim 16 further comprising a data bus connected to said microprocessor for both putting in and taking out measurement data, and
   means for gaining external access to said data bus for transferring such data between said gage and another instrument.

18. The improvement recited in claim 16 further comprising means in said microprocessor for correcting inaccuracies in said thickness calculation, such inaccuracies being caused predominantly by the lateral displacement between said transmitting and receiving transducers on said specimen.

19. The improvement recited in claim 16 further comprising means in said microprocessor for removing power from said gage whenever no valid thickness measurement has occurred for a selected period of time.

20. The improvement recited in claim 16 further comprising means in said microprocessor for repeating said ultrasonic pulse and counter signal generation, a preselected plurality of times, and for calculating said thickness based upon an average of the entirety of said plurality of counter signals, and
   means for rejecting the thickness calculation whenever any such repeated counter signal differs from a prior counter signal for the same measurement by more than a preselected difference.

21. The improvement recited in claim 20 further comprising means in said microprocessor connected to said display for generating a couple bar indication on said display when said repeated count signals are within said preselected difference and for removing said couple bar indication whenever said preselected difference is exceeded.

* * * * *